United States Patent
Basu et al.

(10) Patent No.: US 8,166,204 B2
(45) Date of Patent: Apr. 24, 2012

(54) SYSTEMS AND METHODS FOR AUTOMATICALLY PLACING NODES IN AN AD HOC NETWORK

(75) Inventors: Prithwish Basu, Allston, MA (US); Jason Keith Redi, Belmont, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 2962 days.

(21) Appl. No.: 10/652,255

(22) Filed: Aug. 29, 2003

(65) Prior Publication Data

US 2005/0114551 A1   May 26, 2005

(51) Int. Cl.
*G06F 15/16* (2006.01)
(52) U.S. Cl. .......................................... 709/249
(58) Field of Classification Search .................... 709/249
See application file for complete search history.

(56) References Cited

U.S. PATENT DOCUMENTS

| | | | |
|---|---|---|---|
| 5,175,843 A * | 12/1992 | Casavant et al. | ................. 716/6 |
| 5,541,912 A | 7/1996 | Choudhury et al. | |
| 5,649,119 A | 7/1997 | Kondoh et al. | |
| 5,828,835 A | 10/1998 | Isfeld et al. | |
| 5,878,056 A | 3/1999 | Black et al. | |
| 5,903,735 A | 5/1999 | Kidder et al. | |
| 5,960,047 A * | 9/1999 | Proctor et al. | ................. 375/347 |
| 5,974,327 A | 10/1999 | Agrawal et al. | |
| 6,000,011 A | 12/1999 | Freerksen et al. | |
| 6,067,301 A | 5/2000 | Aatresh | |
| 6,088,734 A | 7/2000 | Marin et al. | |
| 6,094,435 A | 7/2000 | Hoffman et al. | |
| 6,139,199 A | 10/2000 | Rodriguez | |
| 6,173,324 B1 | 1/2001 | D'Souza | |
| 6,215,765 B1 | 4/2001 | McAllister et al. | |
| 6,272,567 B1 | 8/2001 | Pal et al. | |
| 6,330,459 B1 | 12/2001 | Crichton et al. | |
| 6,362,821 B1 * | 3/2002 | Gibson et al. | ................. 345/424 |
| 6,385,673 B1 | 5/2002 | DeMoney | |
| 6,396,814 B1 | 5/2002 | Iwamura et al. | |
| 6,570,867 B1 | 5/2003 | Robinson et al. | |

(Continued)

OTHER PUBLICATIONS

N. Garg, V. Santosh, A. Singla. Improved approximation algorithms for biconnected subgraphs via better lower bounding techniques. Symposium on Discrete Algorithms: Proceedings of the fourth annual ACM-SIAM Symposium on Discrete algorithms. Austin, Texas, United States. pp. 103-111. 1993.*

(Continued)

*Primary Examiner* — John MacIlwinen
(74) *Attorney, Agent, or Firm* — Ropes & Gray LLP

(57) ABSTRACT

A system may place nodes (110) within a non-biconnected network (100) that includes multiple interconnected nodes (110) to achieve biconnectivity within the network (100) and transform the network (100) from a non-biconnected one to a biconnected one. A non-biconnected network is one that necessarily becomes partitioned into two or more disconnected networks if a node in a critical position (termed a "cutvertex" node) should fail or otherwise become unavailable. A biconnected network is one that includes at least one additional network link (sometimes termed an "edge") between nodes belonging to each of the otherwise potentially disconnected networks for the purpose of maintaining network communication therebetween if and when the cutvertex node fails or otherwise becomes unavailable. To achieve biconnectivity, the system may identify one or more nodes (110) to move and determine the direction and distance to move the one or more nodes (110). The system may then move the one or more nodes (110) in the determined direction and distance to transform the non-biconnected network (100) to a biconnected one.

55 Claims, 20 Drawing Sheets

U.S. PATENT DOCUMENTS

| | | | |
|---|---|---|---|
| 6,574,227 B1 | 6/2003 | Rosenberg et al. | |
| 6,611,522 B1 | 8/2003 | Zheng et al. | |
| 6,633,544 B1 | 10/2003 | Rexford et al. | |
| 6,671,819 B1 | 12/2003 | Passman et al. | |
| 6,714,563 B1 | 3/2004 | Kushi | |
| 6,721,273 B1 | 4/2004 | Lyon | |
| 6,829,222 B2 | 12/2004 | Amis et al. | |
| 6,870,846 B2 | 3/2005 | Cain | |
| 6,977,895 B1 | 12/2005 | Shi et al. | |
| 7,020,501 B1 | 3/2006 | Elliott et al. | |
| 7,020,701 B1 | 3/2006 | Gelvin et al. | |
| 7,039,720 B2 | 5/2006 | Alfieri et al. | |
| 7,065,059 B1 | 6/2006 | Zinin | |
| 7,072,952 B2 | 7/2006 | Takehiro et al. | |
| 7,215,926 B2 | 5/2007 | Corbett et al. | |
| 7,281,057 B2 | 10/2007 | Cain | |
| 7,289,456 B2 | 10/2007 | Gupta et al. | |
| 7,353,259 B1 | 4/2008 | Bakke et al. | |
| 2001/0007560 A1 | 7/2001 | Masuda et al. | |
| 2001/0040895 A1* | 11/2001 | Templin | 370/466 |
| 2002/0016869 A1 | 2/2002 | Comeau et al. | |
| 2002/0071392 A1 | 6/2002 | Grover et al. | |
| 2002/0075813 A1 | 6/2002 | Baldonado et al. | |
| 2002/0103893 A1 | 8/2002 | Frelechoux et al. | |
| 2002/0108107 A1 | 8/2002 | Darnell et al. | |
| 2002/0131409 A1 | 9/2002 | Frank et al. | |
| 2002/0143755 A1 | 10/2002 | Wynblatt et al. | |
| 2003/0012168 A1 | 1/2003 | Elson et al. | |
| 2003/0022476 A1 | 1/2003 | Hardee | |
| 2003/0043742 A1 | 3/2003 | De Maria et al. | |
| 2003/0048771 A1 | 3/2003 | Shipman | |
| 2003/0058852 A1 | 3/2003 | Luhmann et al. | |
| 2003/0093576 A1 | 5/2003 | Dettinger et al. | |
| 2003/0152182 A1 | 8/2003 | Pai et al. | |
| 2003/0174654 A1 | 9/2003 | Tateson et al. | |
| 2003/0179751 A1 | 9/2003 | Omae et al. | |
| 2003/0202476 A1 | 10/2003 | Billhartz et al. | |
| 2004/0003111 A1 | 1/2004 | Maeda et al. | |
| 2004/0029553 A1 | 2/2004 | Cain | |
| 2004/0032856 A1 | 2/2004 | Sandstrom | |
| 2004/0131079 A1 | 7/2004 | Hegde et al. | |
| 2004/0213167 A1 | 10/2004 | Garcia-Luna-Aceves et al. | |
| 2005/0013613 A1 | 1/2005 | Stevenson et al. | |
| 2005/0036442 A1 | 2/2005 | Saleh et al. | |

OTHER PUBLICATIONS

Q. Li and D. Rus. Sending Messages to Mobile Users in Disconnected Ad-hoc Wireless Networks. MOBICOM 2000. Aug. 2000.*

A. McAuley and K. Manousakis. Self-Configuring Networks. MILCOM 2000. 21st Century Military Communications Conference, 2000.*

E. Jennings and C. Okino. Topology Control for Efficient Information Dissemination in Ad-hoc Networks. Internations Symposium on Performance Evaluation of Computer and Telecommunicaion Systems SPECTS 2002.*

S. Khuller and U. Vishkin. Biconnectivity approximations and graph carvings. Journal of the ACM, 41(2): 214-235, 1994.*

W. Liao, Y. Tseng and J. Sheu. GRID: A Fully Location-Aware Routing Protocol for Mobile As Hoc Networks. Telecommunication Systems, 18(1): 37-60, 2001.*

T. Hsu. Simpler and faster biconnectivity augmentation. Journal of Algorithms 45 (2002) 55-71.*

C. Lin and M. Gerla. Adaptive Clustering for Wireless Networks. IEEE Journal on Selected Areas in Communications, vol. 15, No. 7, Sep. 1997.*

CMSC 451. Dave Mount. CMSC 451: Lecture 11. Articulation Points and Biconnected Components. Tuesday, Oct. 6, 1998. www.cs.umd.edu/~samir/451/bc.ps. pp. 1-5.*

Basu et al., "Movement Control Algorithms for Realization of Fault-Tolerant Ad Hoc Robot Networks," IEEE Network, pp. 36-44, Jul./Aug. 2004.

Winfield, Alan, "Distributed Sensing and Data Collection Via Broken Ad Hoc Wireless Connected Networks of Mobile Robots," Springer, pp. 273-282, (2000).

Qun Li and Daniel Rus: "Sending Messages to Mobile Users in Disconnected Ad-hoc Wireless Networks," Proc. ACM MobiCom 2000, Aug. 2000, 13 pages.

Ram Ramanathan and Regina Rosales-Hain: "Topology Control of Multihop Wireless Networks using Transmit Power Adjustment," Proc. IEEE INFOCOM 2000, Mar. 2000, 10 pages.

Office Action dated Nov. 2, 2007, U.S. Appl. No. 10/786,335.
Office Action dated Nov. 16, 2007, U.S. Appl. No. 10/649,030.
Office Action dated Dec. 13, 2007, U.S. Appl. No. 10/328,566.
Office Action dated Jan. 22, 2009, U.S. Appl. No. 10/694,968.
Office Action dated Feb. 24, 2009, U.S. Appl. No. 10/786,335.
Office Action dated Feb. 25, 2009, U.S. Appl. No. 10/649,030.
Office Action dated Mar. 3, 2009, U.S. Appl. No. 10/752,988.
Office Action dated May 1, 2009, U.S. Appl. No. 10/913,151.
Notice of Allowance issued Oct. 5, 2010 in U.S. Appl. No. 10/913,151.
Office Action dated Apr. 21, 2010, U.S. Appl. No. 10/752,988.
Office Action dated Oct. 28, 2010, U.S. Appl. No. 12/576,170.
Office Action dated Oct. 27, 2009, U.S. Appl. No. 10/786,335.
Office Action dated Nov. 2, 2009, U.S. Appl. No. 10/752,988.
Office Action dated Nov. 24, 2009, U.S. Appl. No. 10/913,151.
Office Action dated Apr. 18, 2008, U.S. Appl. No. 11/088,045.
Office Action dated Jun. 11, 2008, U.S. Appl. No. 10/786,335.
Office Action dated Jun. 26, 2008, U.S. Appl. No. 10/913,151.

* cited by examiner

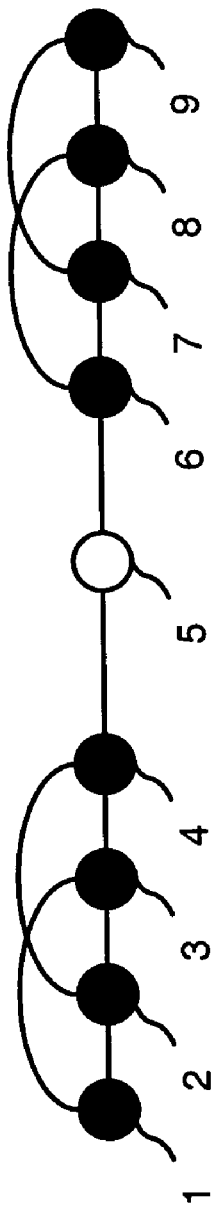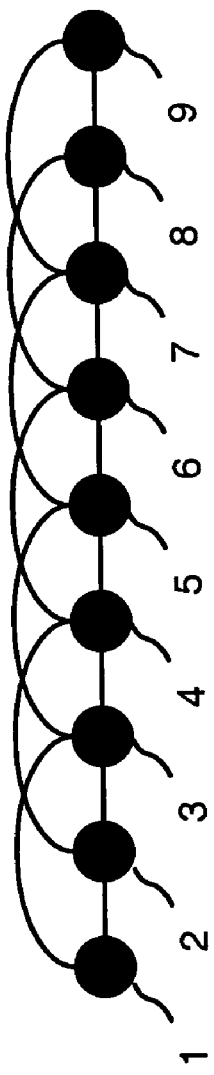

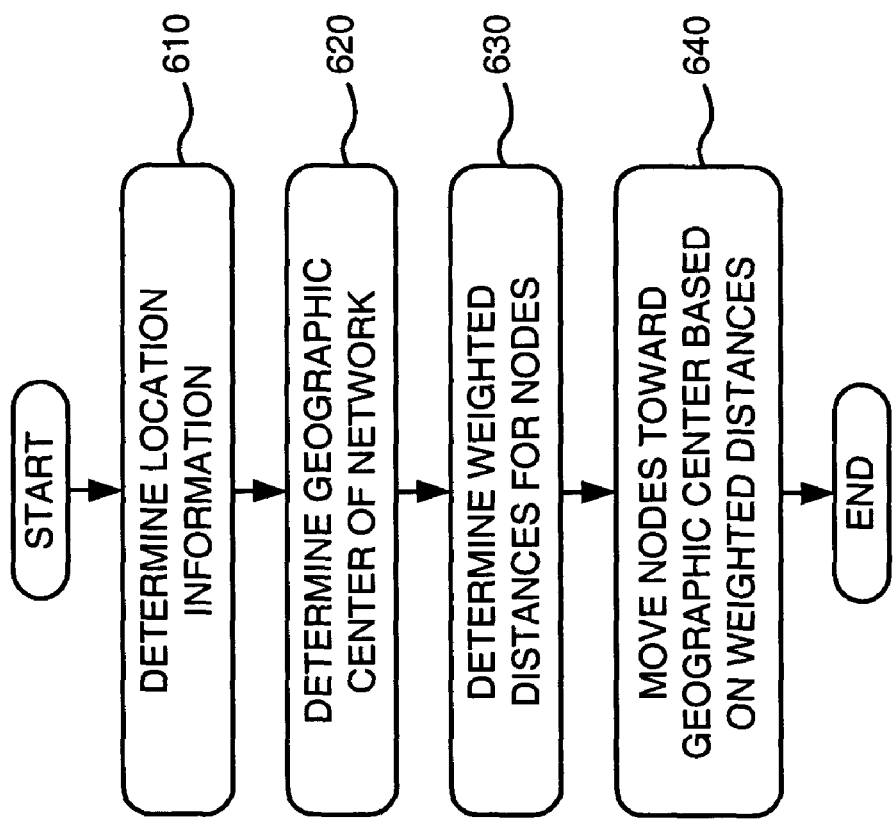

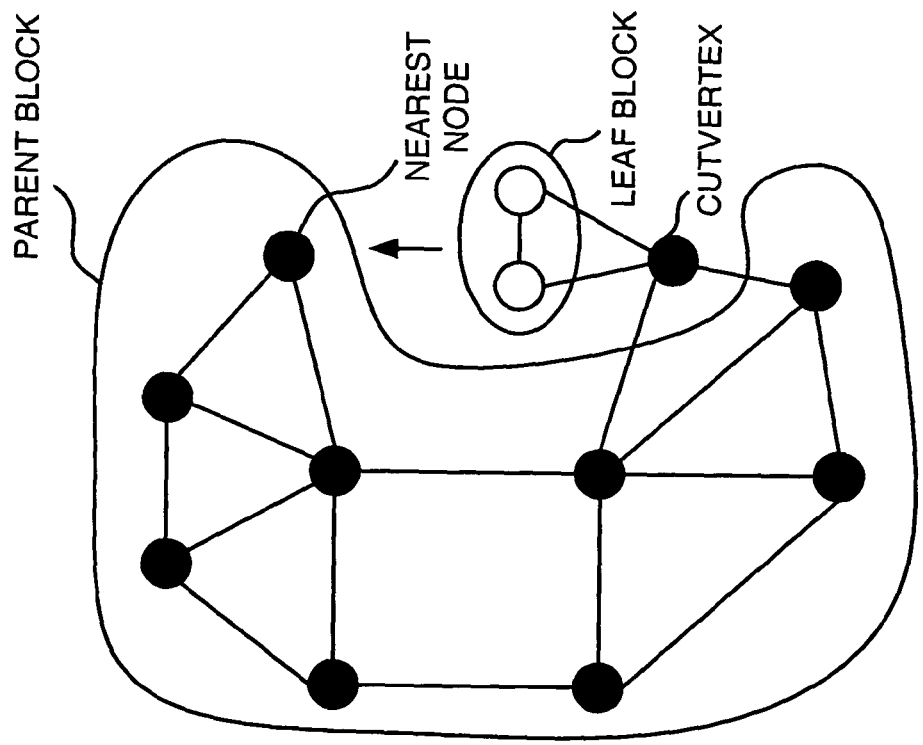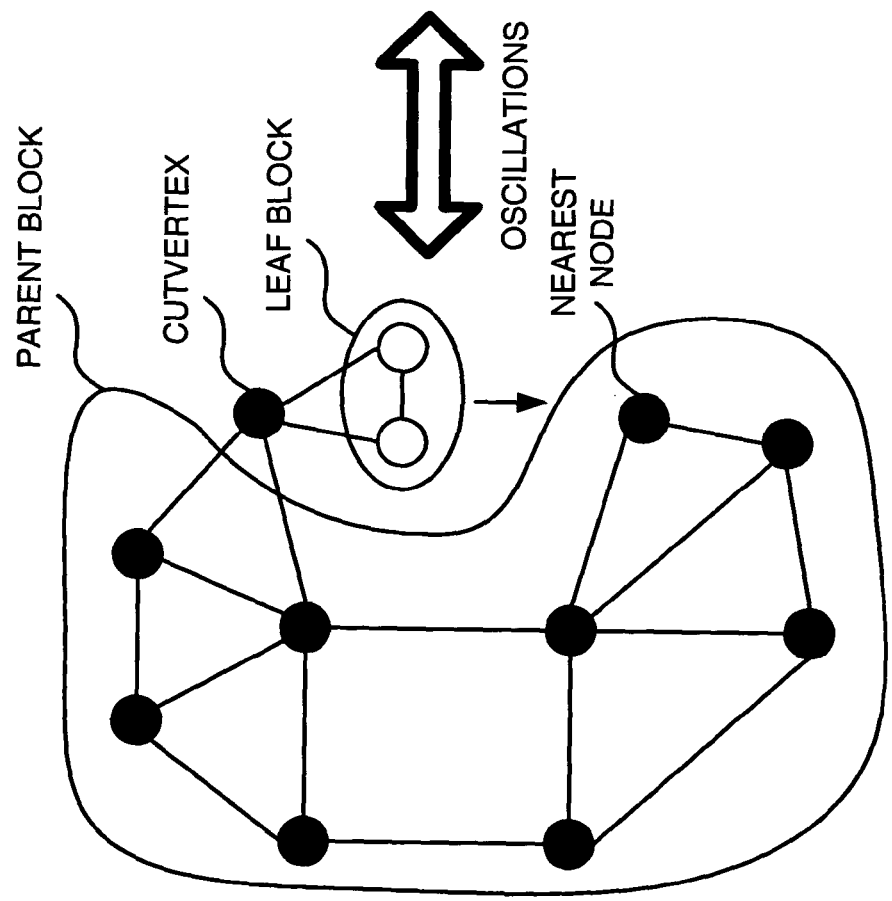
FIG. 10

SYSTEMS AND METHODS FOR AUTOMATICALLY PLACING NODES IN AN AD HOC NETWORK

GOVERNMENT CONTRACT

The U.S. Government may have a paid-up license in this invention and the right in limited circumstances to require the patent owner to license others on reasonable terms as provided for by the terms of Contract No. DASG60-02-C-0060 awarded by the Defense Advanced Research Projects Agency (DARPA).

BACKGROUND OF THE INVENTION

1. Field of the Invention

The present invention relates generally to wireless networks and, more particularly, to systems and methods for automatically placing or moving nodes in a wireless network to provide biconnectivity.

2. Description of Related Art

Advances in electronics and mechanics have provided the basic technologies required for sophisticated robots. It is well recognized that robots have significant operational advantages over humans because they can perform tasks without requirements for rest, food, shelter, or task heterogeneity. This makes them potentially useful in future military exercises on the battlefields (so much so that they may end up undertaking all of the missions their human counterparts perform today), in several disaster relief situations (search and rescue), in cleaning cavities and surfaces that are otherwise cumbersome to clean, in collection of soil and samples on the surface of Mars (distributed sensing), in undertaking routine tasks in flexible manufacturing environments and supermarkets, and in many other scenarios. Most of the aforementioned tasks need collaboration among different robot units for their timely and efficient completion.

Robotics researchers have proposed the use of centralized robotic networks, where all members of a team of robots communicate with a central controller (e.g., base station) over a wireless medium. In most application scenarios, such as the ones described in the previous paragraph, it is difficult to guarantee the presence of a wireless base station that can coordinate the flow of information between any two robot units. Moreover, the movement of robots can be severely restricted in order to keep in communication range of the base station. This can hamper the task that the robot team plans to execute.

There has arisen a need for self-forming, self-healing, and self-organizing multihop communications networks capable of use with autonomous and semi-autonomous robotic systems. Although numerous ad hoc network protocols, such as packet radio, mobile ad hoc networks (MANETs), or self-organizing networks, have been proposed and implemented, all of them were designed to be completely transparent to applications. One of the main reasons for adopting this approach is that the protocols are intended to be used with a wide variety of platforms and applications. The resulting extended applicability, however, comes at the cost of severe restrictions in the exchange of information between the application and the network, making it virtually impossible for them to anticipate each other's behavior and, thus, cooperate.

In robotic systems, cooperation among the robotic applications is highly desirable because robotic applications generally entail movement, which directly affects the communication network. Conversely, the propagation of radio transmissions used for communication may be able to provide an additional way of sensing the environment. Such interaction is a feasible proposition because robots are unique in their integrated design in that the mission control, motion control, and networking protocols are typically all implemented within the same architecture.

Ad hoc networks that include robotic nodes have a salient difference from standard MANETs. In the former networks, for example, the position and motion of nodes is controllable from other nodes in the network. In the latter networks, motion is determined by the owner of the node and is not usually controllable.

As a result, there continues to be a need for self-forming, self-healing, and self-organizing multihop communications networks capable of use with autonomous and semi-autonomous robotic systems.

SUMMARY OF THE INVENTION

Systems and methods consistent with the present invention place or alter the position of robotic nodes in order to achieve biconnectivity within an ad hoc network. A subset of the nodes may be moved from their initial locations to a new set of locations such that the newly formed network is more tolerant of node failures.

In one aspect consistent with the principles of the invention, a method for achieving biconnectivity in a non-biconnected network is provided. The non-biconnected network includes multiple nodes. The method may include identifying one or more of the nodes to move and determining direction and distance to move the one or more nodes. The method may also include moving the one or more nodes in the determined direction and distance to transform the non-biconnected network to a biconnected network.

According to another aspect, a method for achieving biconnectivity in a network that includes multiple nodes is provided. The method may include forming blocks from groups of one or more of the nodes in the network, selecting one of the blocks as a root block, and identifying other ones of the blocks as leaf blocks. The method may also include moving one or more of the leaf blocks to make the network biconnected.

According to yet another aspect, a system for achieving biconnectivity in a network that includes multiple nodes is provided. The system may include means for grouping subsets of the nodes into blocks and means for identifying cutvertices in the network. The system may also include means for iteratively moving one or more of the blocks to remove the cutvertices from the network.

According to a further aspect, at least one node in a network that includes multiple nodes is provided. The node(s) may include a network device that is capable of moving within the network and a movement controller that is configured to generate a current view of the network. The movement controller is further configured to form blocks from groups of one or more of the nodes in the network based on the current view of the network and identify one or more of the blocks to move to make the network biconnected.

According to another aspect, a method for achieving biconnectivity in a network that includes multiple nodes is provided. The method may include generating a graph of the network and identifying cutvertices in the network. The method may further include moving one or more of the nodes in the network to systematically remove the cutvertices from the network and form a biconnected network.

According to yet another aspect, a method for achieving biconnectivity in a non-biconnected network that includes multiple nodes is provided. The method may include determining a geographic center of the non-biconnected network and moving each of one or more of the nodes a weighted distance towards the geographic center to transform the non-biconnected network to a biconnected network.

According to a further aspect, a system for achieving biconnectivity in a non-biconnected network that includes multiple nodes is provided. The system may include means for identifying a geographic center of the non-biconnected network based on current locations of the nodes, and means for causing each of one or more of the nodes to move towards the geographic center to transform the non-biconnected network to a biconnected network.

According to another aspect, a method for achieving biconnectivity in a one-dimensional non-biconnected network that includes multiple nodes is provided. The method may include determining initial positions of the nodes in the one-dimensional non-biconnected network and determining a movement schedule for the nodes using one or more linear programming techniques. The method may also include causing one or more of the nodes to move based on the determined movement schedule to form a biconnected network from the one-dimensional non-biconnected network.

According to yet another aspect, a system for achieving biconnectivity in a one-dimensional non-biconnected network that includes multiple nodes is provided. The system may include means for determining initial positions of the nodes in the one-dimensional non-biconnected network and means for determining a movement schedule optimally in polynomial time (a function of a mathematical polynomial or series expansion) based at least in part on the initial positions of the nodes and the number of nodes in the one-dimensional non-biconnected network. The system may also include means for causing one or more of the nodes to move based on the determined movement schedule to achieve biconnectivity in the one-dimensional non-biconnected network.

BRIEF DESCRIPTION OF THE DRAWINGS

The accompanying drawings, which are incorporated in and constitute a part of this specification, illustrate the invention and, together with the description, explain the invention. In the drawings.

FIGS. 5A and 5B are exemplary diagrams of a one-dimensional network according to an implementation consistent with the principles of the invention;

FIG. 6 is a flowchart of exemplary processing for achieving biconnectivity in a two-dimensional network using a contraction technique, according to an implementation consistent with the principles of the invention;

FIG. 10 illustrates an exemplary situation where a block's movement causes an oscillation between two points;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Autonomous and semi-autonomous mobile multi-robot systems require a wireless communication network in order to communicate with each other and collaboratively accomplish a given task. A multihop communications network that is self-forming, self-healing and self-organizing is well suited for such mobile robotic systems that exist in unpredictable and constantly changing environments. Because every node in a multihop (or ad hoc) network is responsible for forwarding packets to other nodes, however, the failure of a critical node can result in a network partition. Hence, it may be beneficial to have an ad hoc network configuration that can tolerate temporary failures while allowing recovery. Because movement of the robotic nodes is controllable, it is possible to achieve such fault tolerant configurations by moving some or all of nodes to new locations.

Systems and methods consistent with the principles of the invention transform a connected, but non-biconnected network configuration to a biconnected one by suggesting that certain nodes move to new positions. The systems and methods may, for example, place or alter the position of certain nodes such that the newly formed network is more tolerant of node failures.

Exemplary Network

Figure 1:
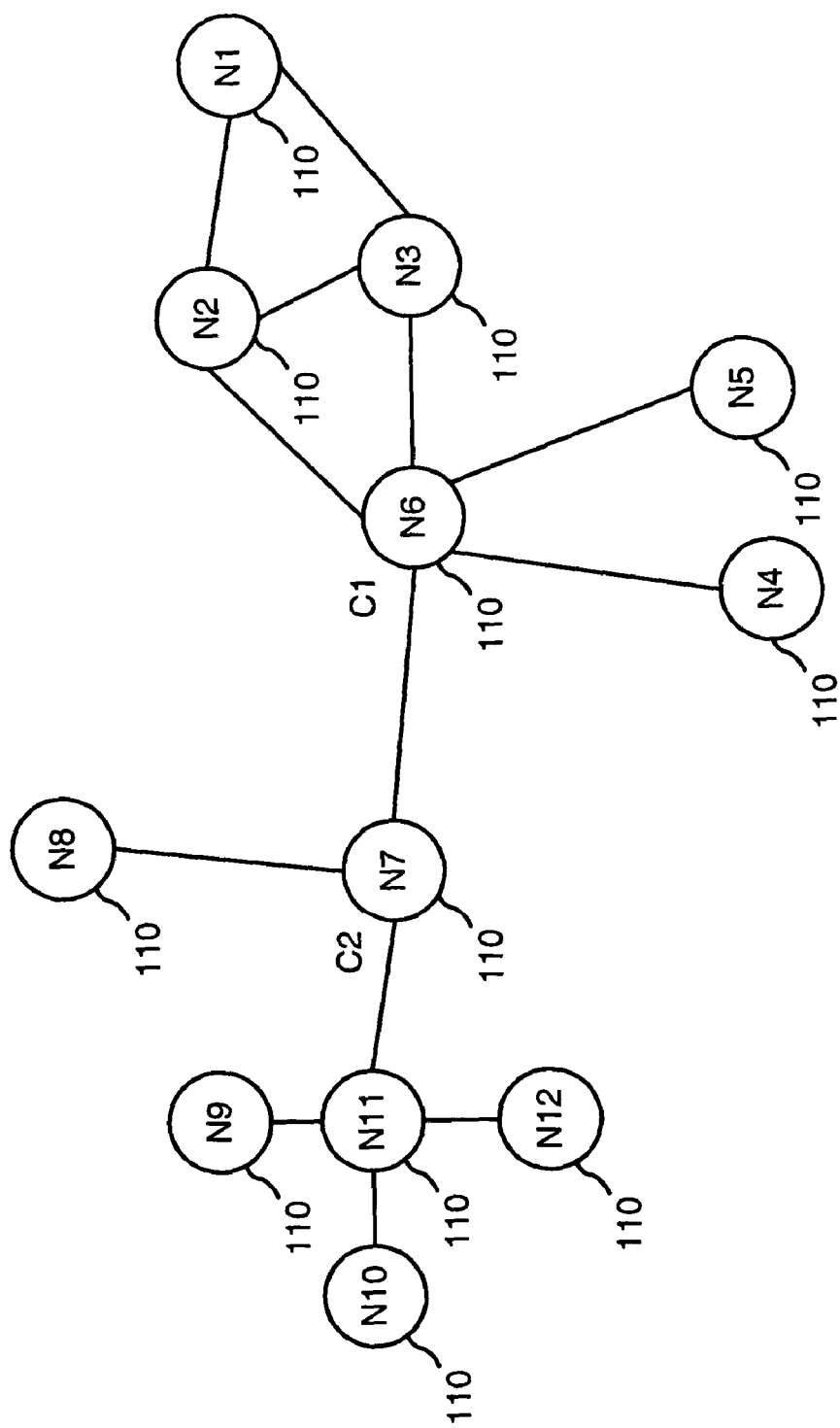
FIG. 1 is a block diagram of an exemplary network in which systems and methods consistent with the principles of the invention may be implemented.

FIG. 1 is a diagram of an exemplary network 100 in which systems and methods consistent with the principles of the invention may be implemented. Network 100 may include multiple inter-connected nodes 110 N1-N12. While twelve nodes 110 are illustrated in FIG. 1, a typical network 100 may include more or fewer nodes 110. Nodes 110 may communicate with each other via wireless connections to form a wireless ad hoc network.

Nodes 110 may include nodes that are capable of moving, such as robotic nodes, and thus, altering the topology of network 100. Each node 110 may operate to perform some function or achieve some objective, either alone or in combination with one or more other nodes 110.

Nodes 110 may maintain knowledge about the rest of network 100. For example, each node 110 may periodically broadcast a link state update (LSU) that includes its location information (e.g., global positioning system (GPS) coordinates or indoor relative location information) to the rest of network 100. Nodes 110 may use proactive link state-based routing protocols, such as optimized link state routing (OLSR) and high speed link signaling (HSLS), when sending their LSU.

Figure 2:
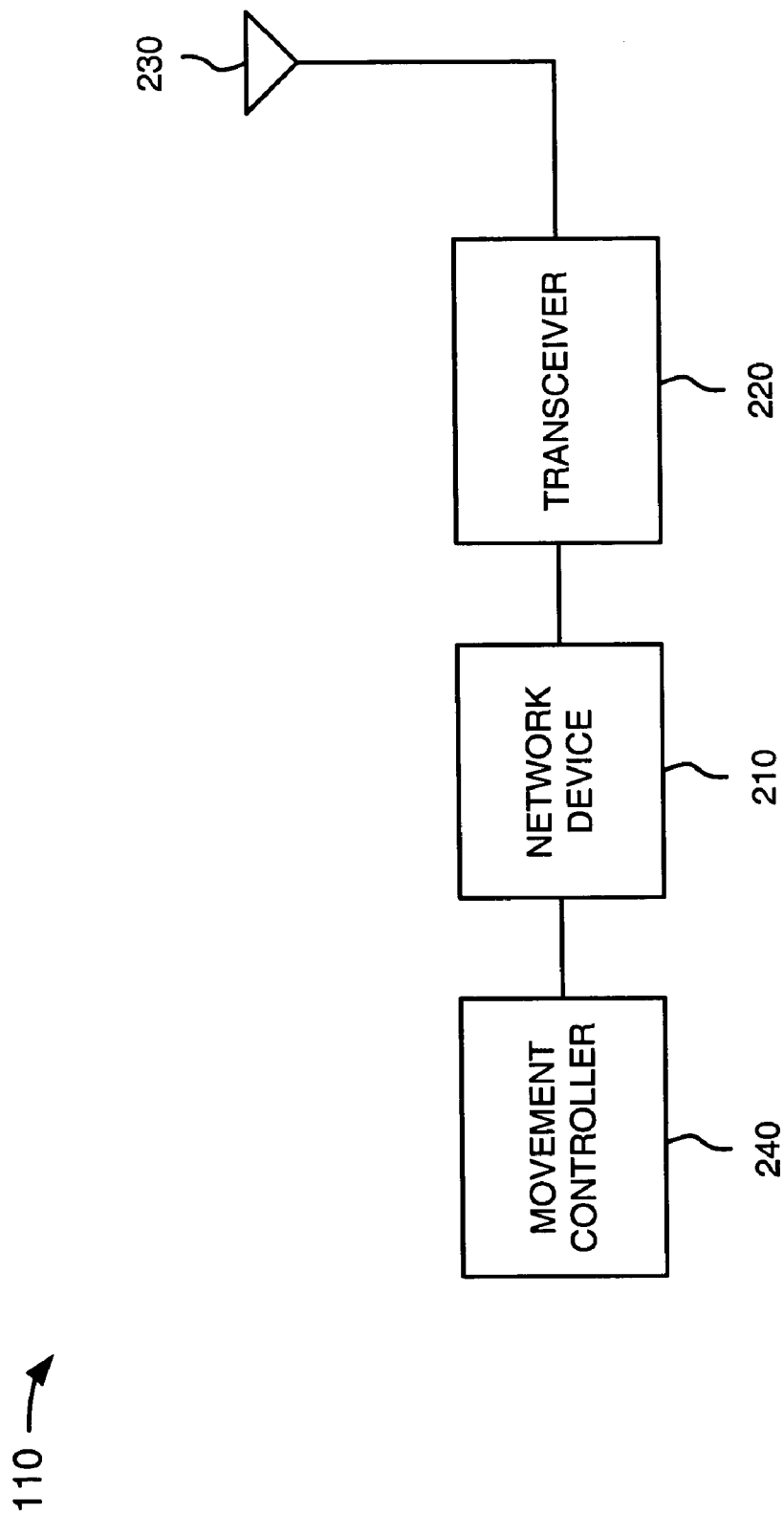
FIG. 2 is an exemplary block diagram of one of the nodes in the network of FIG. 1 according to an implementation consistent with the principles of the invention.

FIG. 2 is an exemplary diagram of one of nodes 110 according to an implementation consistent with the principles of the invention. Other ones of nodes 110 may be similarly configured. Node 110 may include a network device 210, a transceiver 220, an antenna 230, and a movement controller 240. Network device 210 may include a robotic device that is capable of moving and performing some function or carrying out some objective, either alone or in combination with other nodes 110. Transceiver 220 may include a conventional transceiver (or a separate receiver and transmitter) that facilitates communication with other nodes 110. Antenna 230 may include a directional and/or an omni-directional antenna that aids in the reception and transmission of data.

Movement controller 240 may determine the direction and/or distance that node 110 should move, if necessary, to help change the topology of network 100 from a non-biconnected network configuration to a biconnected one. It is important to note that it may not be necessary for all of nodes 110 to move in order to achieve biconnectivity within network 100.

As will be described in detail below, movement controller 240, according to an implementation consistent with the principles of the invention, may determine the manner (direction and distance or no movement) that node 110 should move to make network 100 biconnected and, thereby, improve the fault tolerance of network 100. Movement controller 240 may be implemented in software, possibly executed by network device 210. Alternatively, movement controller 240 may be implemented in hardware, or a combination of hardware and software, that provides its determination to network device 210.

Biconnectivity within a network improves the fault tolerance of the network. For example, if network 100 is biconnected and a node 110 in network 100 fails or becomes unavailable for some reason, network 100 does not become partitioned. Therefore, nodes 110 may attempt to form a biconnected network as long as that does not interfere with their current objective. This may necessitate that some of nodes 110 move to create extra links such that the resultant topology is biconnected.

Figure 3B:
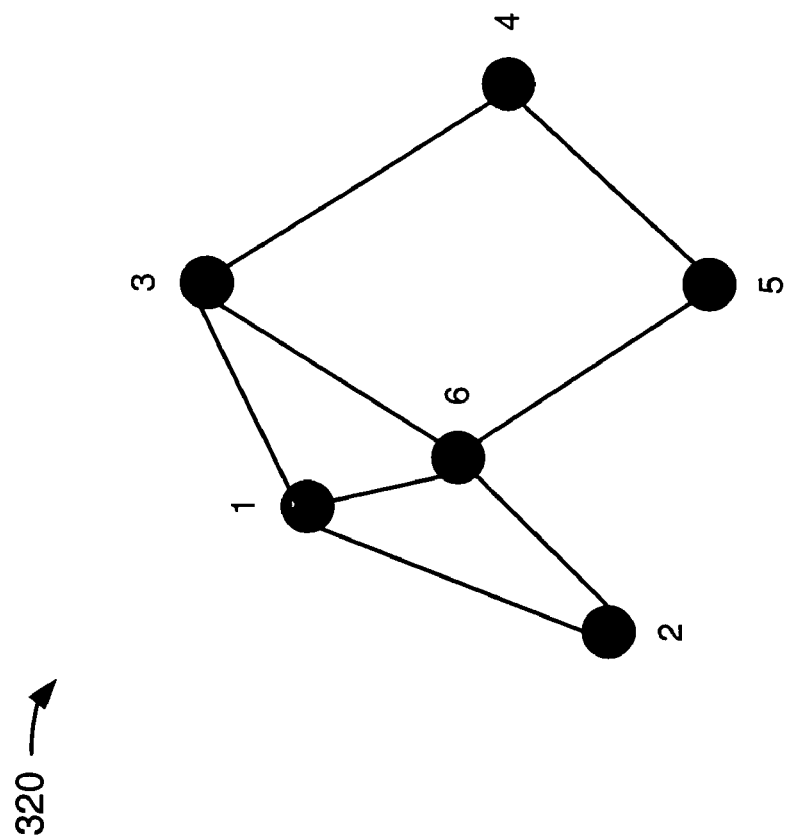
FIGS. 3A and 3B illustrate a simple example of achieving a biconnected network according to implementations consistent with the principles of the invention.
Figure 3A:
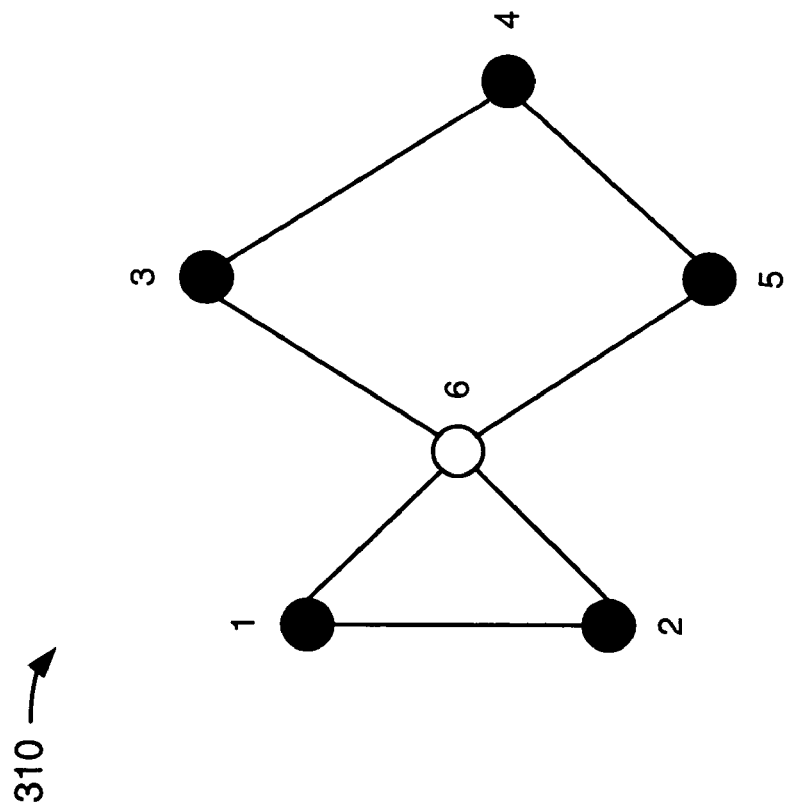

FIGS. 3A and 3B illustrate a simple example of achieving a biconnected network according to an implementation consistent with the principles of the invention. FIG. 3A is a diagram of a non-biconnected network 310. In network 310, node 6 is a cutvertex, which means that if node 6 were to fail, or otherwise become unavailable, network 310 would become partitioned. In other words, nodes 1 and 2 would no longer be connected to nodes 3-5. Likewise, nodes 3-5 would no longer be connected to nodes 1 and 2. Cutvertex node 6 is shown unfilled in FIG. 3A to contrast it with the other nodes that are shown as filled.

By moving node 1 (in this example in the direction generally towards the location of node 3), however, non-biconnected network 310 would be transformed to a biconnected network 320, as illustrated in FIG. 3B. In network 320, no cutvertices remain and all nodes are, thus, shown as filled. Therefore, the failure, or unavailability, of any one node would not change the connectivity of network 320.

Exemplary Processing

One-Dimensional Situation

Figure 4:
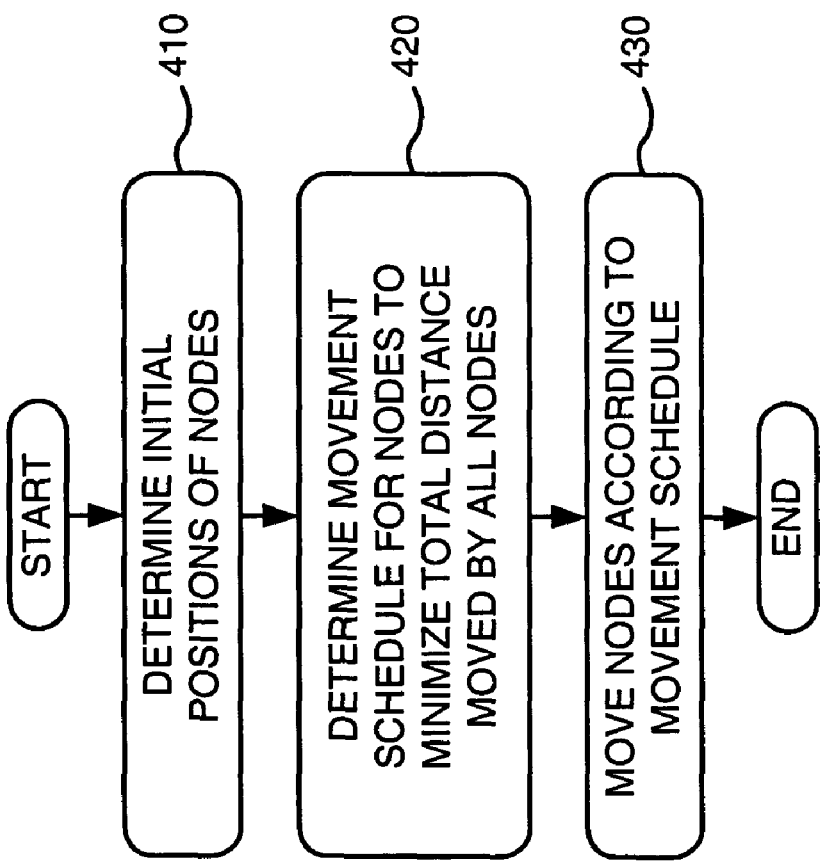
FIG. 4 is a flowchart of exemplary processing for achieving biconnectivity in a one-dimensional network according to an implementation consistent with the principles of the invention.

FIG. 4 is a flowchart of exemplary processing for achieving biconnectivity in a one-dimensional network according to an implementation consistent with the principles of the invention. FIGS. 5A and 5B are exemplary diagrams of a one-dimensional network according to an implementation consistent with the principles of the invention. As illustrated in FIG. 5A, all nodes lie in a single line and have only one degree of freedom in movement: they can move either to the right or to the left. Node 5 is a cutvertex in FIG. 5A.

Processing may begin by determining the initial positions of the nodes (act 410). The nodes may periodically broadcast a LSU that includes its location. The initial positions of the nodes may be represented by $p_i \in R$. $1 \leq i \leq N$, where N is the total number of nodes. Suppose that the positions of the nodes in a new configuration $C_{new}$ are given by $x_i \in R$. $1 \leq i \leq N$.

A movement schedule for the nodes may then be determined to transform $C_{new}$ to a biconnected configuration, while minimizing the total distance moved by all of the nodes (an isomorphic metric is average distance moved by a node) (act 420). The movement schedule may be represented by:

$$\text{minimize } D_{total} = \sum_{i=1}^{N} |x_i - p_i|$$

subject to:

$$x_1 \geq p_1; \tag{1}$$

$$x_N \leq p_N; \tag{2}$$

$$x_i - x_{i-1} \geq 0, 2 \leq i \leq N; \tag{3}$$

$$x_i - x_{i-2} \leq 1, 3 \leq i \leq N; \tag{4}$$

Constraints 1 and 2 are non-binding constraints that illustrate the fact that the one-dimensional network will compress in length after a biconnected configuration is reached. The N-1 linear ordering constraints in (3) restrict the search space as no node needs to move past its neighbors to achieve biconnectivity. Biconnectivity is ensured by the N-2 constraints which basically impose a condition on the nodes that every alternate pairs of nodes are within transmission range of each other. This ensures biconnectivity within the network.

The movement schedule can be solved optimally in polynomial time (as a function of N). Because the objective function has a non-linear term (absolute value), the movement schedule can be converted into a linear programming (LP) problem in the following manner. N new variables $z_i$ can be introduced to rewrite the optimization problem as follows:

$$\text{minimize } D_{total} = \sum_{i=1}^{N} z_i$$

subject to:

$$z_i \geq x_i - p_i, 1 \leq i \leq N; \tag{5}$$

$$z_i \geq -x_i + p_i, 1 \leq i \leq N; \tag{6}$$

$$x_1 \geq p_1; \tag{7}$$

$$x_N \leq p_N; \tag{8}$$

$$x_i - x_{i-1} \geq 0, 2 \leq i \leq N; \tag{9}$$

$$x_i - x_{i-2} \leq 1, 3 \leq i \leq N; \tag{10}$$

Rewritten in the standard form, this becomes:

minimize $c^T x$ subject to: $Ax \geq b$, where $$x^T = [x_1, x_2, \ldots, x_N, z_1, z_2, \ldots, z_N]$$

$$c^T = [\underbrace{0, 0, \ldots, 0}_{N}, \underbrace{1, 1, \ldots, 1}_{N}]$$

$$b^T = [-p_1, -p_2, \ldots, -p_N, p_1, p_2, \ldots,$$

$$p_N, p_1, -p_N, 0, 0, \underbrace{\ldots}_{N-1}, 0, -1, -1, \underbrace{\ldots}_{N-2}, -1]$$

$$A = \begin{bmatrix} -1 & 0 & 0 & \cdots & 0 & 0 & 1 & 0 & \cdots & 0 \\ 0 & -1 & 0 & \cdots & 0 & 0 & 0 & 1 & \cdots & 0 \\ 0 & 0 & -1 & \cdots & 0 & 0 & 0 & 0 & \cdots & 0 \\ \vdots & \vdots & \vdots & & \vdots & \vdots & \vdots & \vdots & & \vdots \\ 0 & 0 & 0 & \cdots & -1 & 0 & & & & \\ 0 & 0 & 0 & \cdots & 0 & -1 & 0 & 0 & \cdots & 1 \\ 1 & 0 & 0 & \cdots & 0 & 0 & 1 & 0 & \cdots & 0 \\ 0 & 1 & 0 & \cdots & 0 & 0 & 0 & 1 & \cdots & 0 \\ 0 & 0 & 1 & \cdots & 0 & 0 & 0 & 0 & \cdots & 0 \\ \vdots & \vdots & \vdots & & \vdots & \vdots & \vdots & \vdots & & \vdots \\ 0 & 0 & 0 & \cdots & 1 & 0 & & & & \\ 0 & 0 & 0 & \cdots & 0 & 1 & 0 & 0 & \cdots & 1 \\ 1 & 0 & 0 & \cdots & 0 & 0 & 0 & 0 & \cdots & 0 \\ 0 & 0 & 0 & \cdots & 0 & -1 & 0 & 0 & \cdots & 0 \\ -1 & 1 & 0 & \cdots & 0 & 0 & 0 & 0 & \cdots & 0 \\ 0 & -1 & 1 & \cdots & 0 & 0 & 0 & 0 & \cdots & 0 \\ \vdots & \vdots & \vdots & & \vdots & \vdots & \vdots & \vdots & & \vdots \\ 0 & 0 & 0 & \cdots & -1 & 1 & 0 & 0 & \cdots & 0 \\ 1 & 0 & -1 & 0 & \cdots & 0 & 0 & 0 & \cdots & 0 \\ 0 & 1 & 0 & -1 & \cdots & 0 & 0 & 0 & \cdots & 0 \\ \vdots & \vdots & & \vdots & & \vdots & \vdots & \vdots & & \vdots \\ 0 & 0 & \cdots & 1 & 0 & -1 & 0 & 0 & \cdots & 0 \end{bmatrix}$$

In the above LP formulation, x and c are 2N×1 vectors, b is a 4N−1×1 vector and A is a 4N−1×2N matrix. In other words, there are 2N decision variables ($x_i$'s and $z_i$'s) and 4N−1 constraints. Hence, the problem is amenable to a solution in polynomial time (in N).

One or more nodes may then move according to the movement schedule (act 430). For example, nodes 1-5 may move to the right in FIG. 5A to transform the network to the network illustrated in FIG. 5B. As shown in FIG. 5B, each node can communicate with the nodes one hop away, as well as the nodes two hops away.

Two-Dimensional Situation: Contraction Technique

Figure 7C:
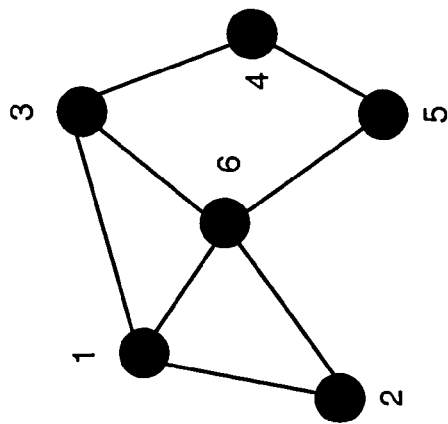
FIGS. 7A-7C are exemplary diagrams of a two-dimensional network according to an implementation consistent with the principles of the invention.
Figure 7B:
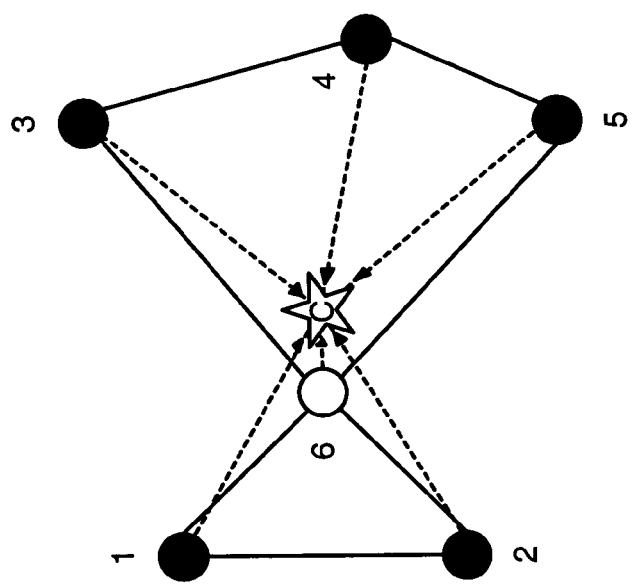
Figure 7A:
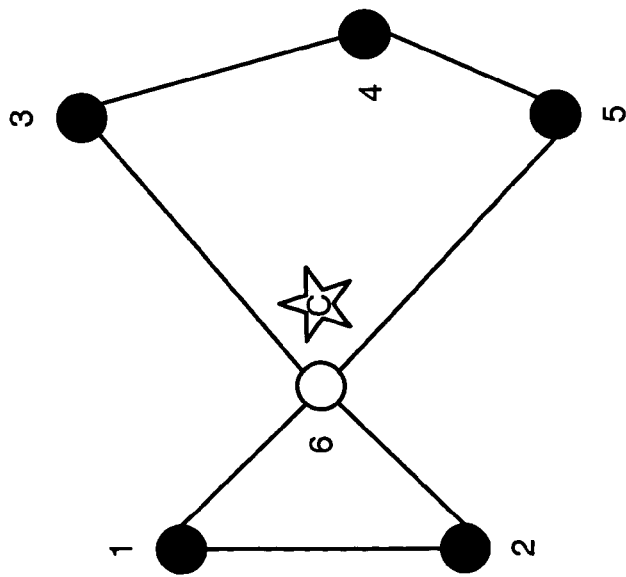

FIG. 6 is a flowchart of exemplary processing for achieving biconnectivity in a two-dimensional network using a contraction technique, according to an implementation consistent with the principles of the invention. FIGS. 7A-7C are exemplary diagrams of a two-dimensional network according to an implementation consistent with the principles of the invention. FIG. 7A illustrates an exemplary non-biconnected two-dimensional network. As shown in FIG. 7A, node 6 is a cutvertex.

Processing may begin with each of the nodes broadcasting a LSU that includes its location information (e.g., GPS coordinates or indoor relative location information) to the rest of the network. When a node receives LSUs from all of the other nodes in the network, the node may extract the location information for the other nodes and determine the network topology therefrom (act 610).

The node may then determine the geographic center C for the entire network (act 620), as illustrated in FIG. 7A. For example, the geographic center C may be determined based on:

$$C = \frac{1}{N} \sum_{m=1}^{N} p_m, \tag{11}$$

where $p_m$ is the position vector of node m. In the one-dimensional situation, $P_m \in R$, but in the two-dimensional situation, $p_m = (x_m, y_m)$, $x_m, y_m \in R$.

After calculating the geographic center C of the network, the nodes may determine weighted distances for moving toward C (act 630). In this implementation, all nodes move towards C by a weighted distance (act 640), as illustrated in FIG. 7B. The weighted distances may be determined based on the following: if a contraction parameter is a, a node m with current position $p_m$ may move radially inward towards the center C by the distance $(1-\alpha)\|\vec{C} - \vec{p}_m\|$.

As a result, nodes near the periphery of the network (e.g., nodes 1-5 in FIG. 7B) move a greater distance than the nodes in the interior of the network (e.g., node 6 in FIG. 7B). For example, the nodes very near the center C (e.g., node 6) may move very little distance. The rationale behind moving the nodes towards the center C is that as they move inward, the network topology will become richer and richer. Also, because of the introduction of more edges (links between nodes), the cutvertices will be removed and the network will eventually become biconnected.

The choice of parameter a may be important. For example, if $\lim \alpha \to 1.0$, every node may move only a small distance. On the other hand, if $\lim \alpha \to 0$, the nodes may eventually collapse to the center C of the network. Hence, choosing a small a results in unnecessarily dense networks (albeit with higher connectivity than 2), whereas, choosing a large a results in little change in the network topology. In the latter case, the above processing may be repeated until the network is biconnected, as illustrated in FIG. 7C.

Note that each node m may travel on the same straight line joining its starting position $p_m$ and the center C, even when multiple iterations are needed to make the network biconnected. Hence, when the network reaches a final biconnected configuration with node positions $p'_m$, the total distance traveled may be represented by:

$$D_{total} = \sum_{m=1}^{N} \|\vec{p'}_m - \vec{p}_m\|. \tag{12}$$

Two-Dimensional Situation: Block Movement Technique

Figure 8:
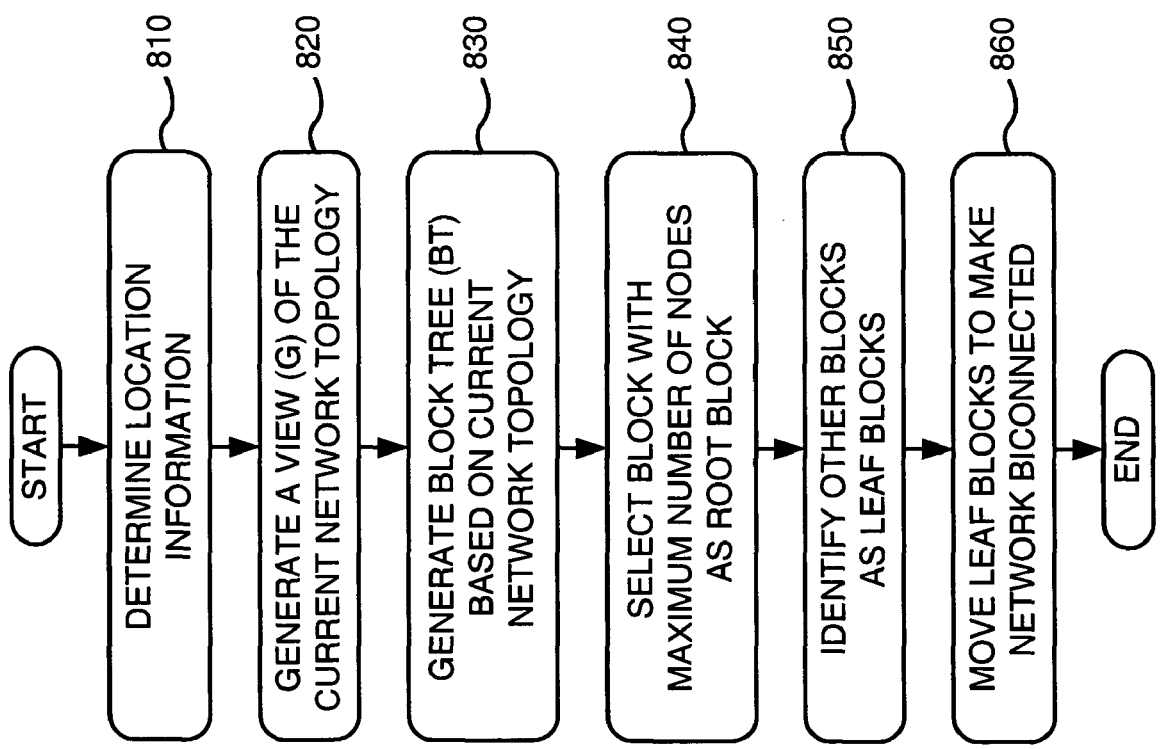
FIG. 8 is a flowchart of exemplary processing for achieving biconnectivity in a two-dimensional network using a block movement technique, according to an implementation consistent with the principles of the invention.
Figure 9A:
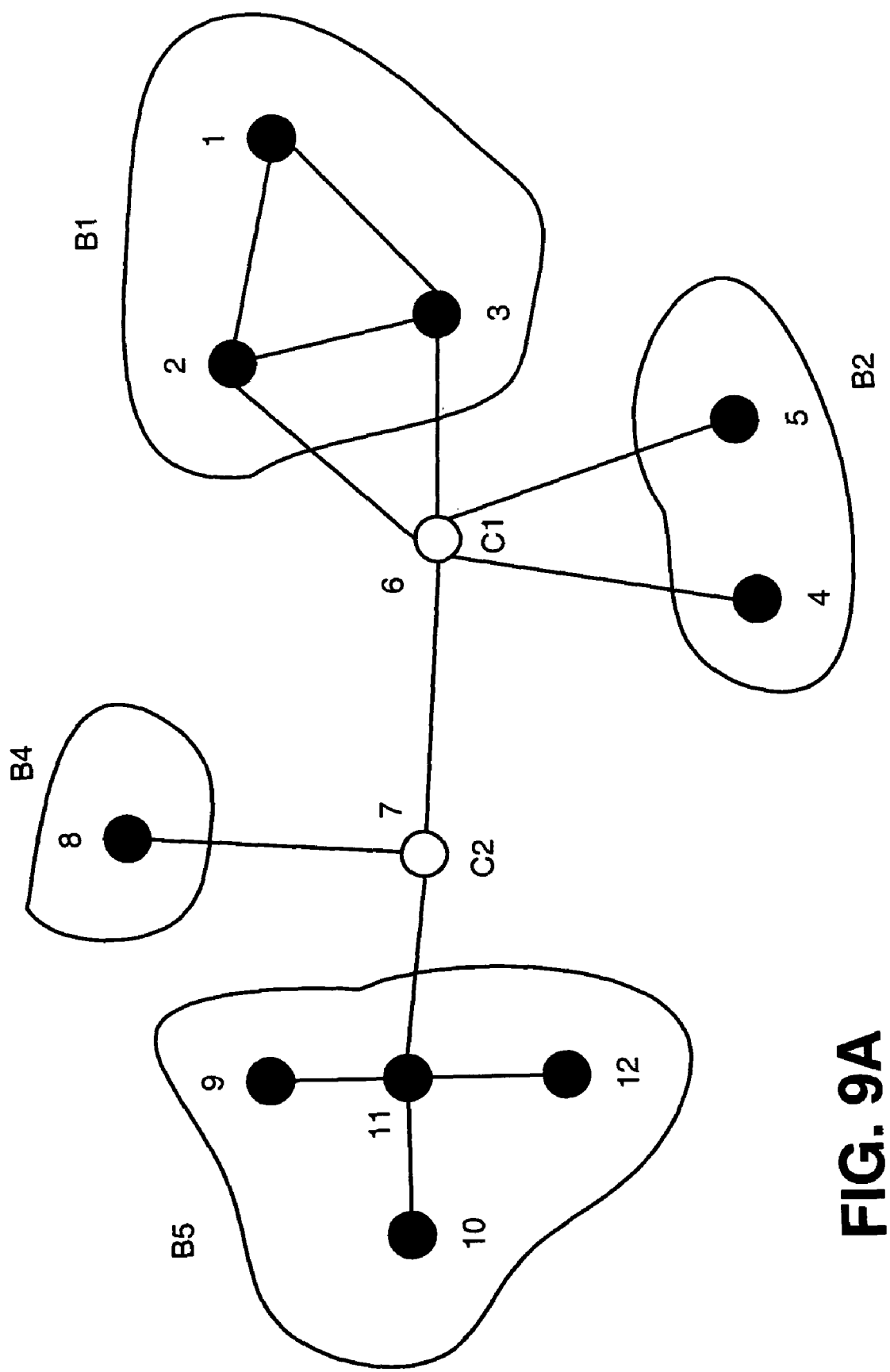
FIGS. 9A and 9B are exemplary diagrams of a two-dimensional network according to an implementation consistent with the principles of the invention.
Figure 9B:
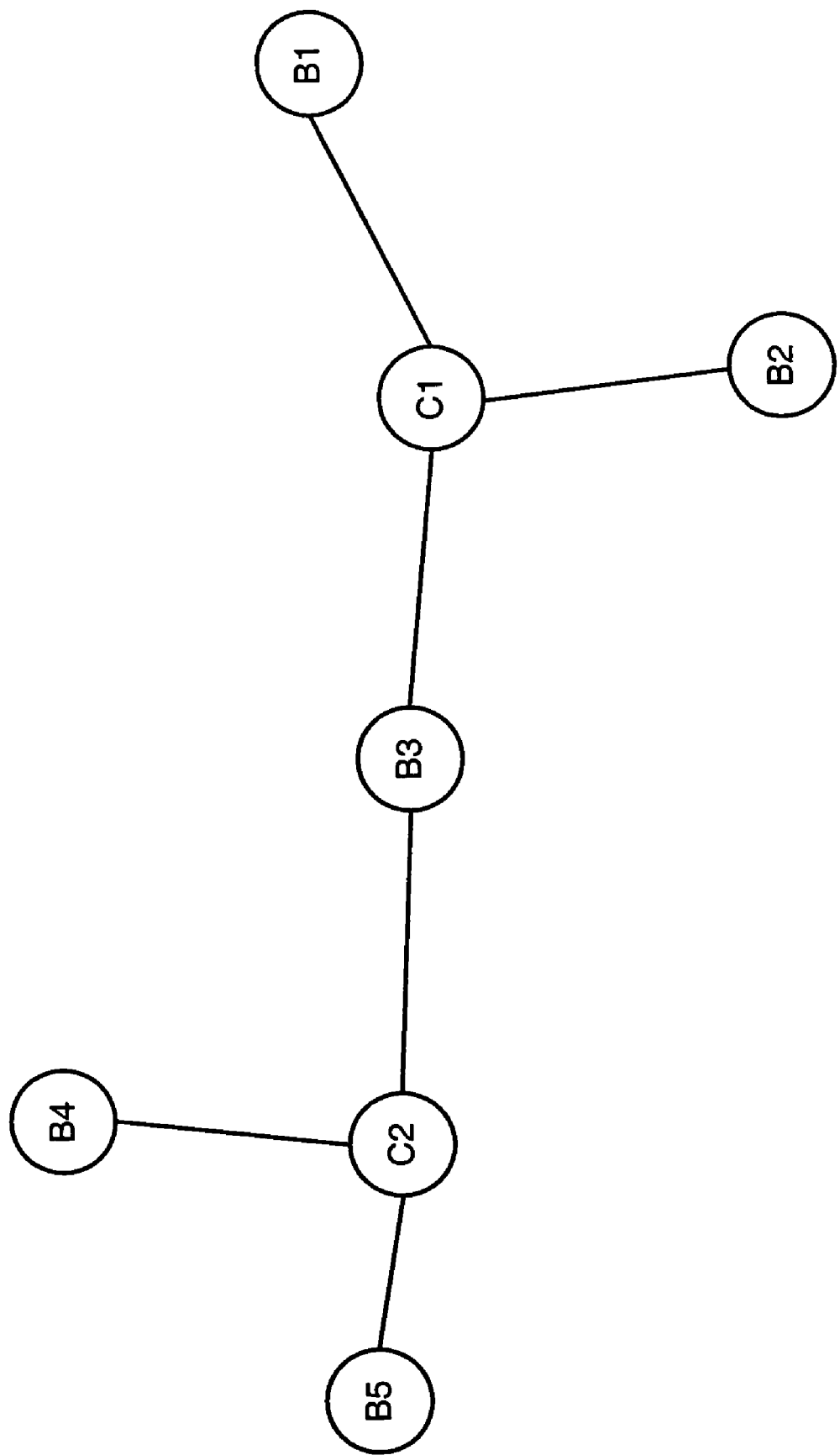

FIG. 8 is a flowchart of exemplary processing for achieving biconnectivity in a two-dimensional network using a block movement technique, according to an implementation consistent with the principles of the invention. FIGS. 9A and 9B are exemplary diagrams of a two-dimensional network according to an implementation consistent with the principles of the invention. FIG. 9A illustrates an exemplary non-biconnected two-dimensional network. As shown in FIG. 9A, nodes 6 and 7 are cutvertices.

In this implementation, a biconnected network configuration may be achieved in low order polynomial time while reducing the total distance traveled by the nodes. To do this, all cutvertices may be systematically removed from the network by moving nodes to new locations.

Processing may begin when the nodes broadcast a LSU that contains their location information. Every node receives LSU updates from other nodes in the network and determines location information regarding the nodes in the network from the LSU updates (act 810).

The nodes may also extract neighbor information from the LSU updates in order to construct a network graph G (FIG. 9A) that represents a current view of the network topology (act 820). In a perfect world, knowing the location and the transmission range of each node is enough to construct a view of the network topology. In the real world, however, neighbor information from every node may also be useful in constructing the network graph G.

The network may be represented by the graph $G=(V, E)$ that includes a set of vertices V and a set of edges E, such that $E \subset V \times V$. A vertex is a node with a location attribute pos and a transmission range attribute R. In one implementation, it may be assumed that all of the nodes include omni-directional antennas and identical wireless propagation characteristics resulting in the same value of R. In this case, an edge $e=(u, v)$ exists between vertices u and v only if $\|u.pos, v.pos\| \leq R$. Graphs, such as graph G, are also known as unit disk graphs. Graph G is called r-partite if V admits a partition into r classes such that every edge has its ends in different classes (i.e., vertices in the same partition class are not adjacent). 2-partite is usually referred to as bipartite.

A non-empty graph G is called connected if any two of its vertices are linked by a path in G. If $G' \subset G$ and G' contains all edges xy$\in$E with x, y$\in$V', then G' is a subgraph of G induced or spanned by V' in G. A maximal connected subgraph of G is called a connected component of G. If A, $B \subset V$ and $X \subset V \cup E$ are such that every A—B path in G contains a vertex or an edge from X, then X can be considered to separate the sets A and B in G. A vertex that separates two other vertices of the same connected component is referred to as a cutvertex and an edge separating its endpoints is referred to as a bridge. Thus, the bridges in a graph include those edges that do not lie on any cycle.

Graph G is called k—connected if $|G|>k$ and G−X is connected for every set $X \subset V$ with $|X|<k$. In other words, no two vertices in G are separated by fewer than k other vertices. The greatest integer k, such that G is k—connected, is the connectivity k(G) of G. If k(G)=2, then G is said to be biconnected (i.e., removal of no vertex of G causes a separation of the remaining vertices).

After constructing a full view of the network topology, each node may independently generate a block tree BT (FIG. 9B) of the topology graph G (act 830). In FIG. 9A, the biconnected nodes (or blocks) of the graph G include nodes 1-5 and 8-12 and the cutvertices include nodes 6 and 7. In FIG. 9B, a corresponding block tree BT is illustrated. It should be understood that FIG. 9B shows only network blocks and not links between nodes within and amongst the blocks.

The block tree BT may include the following properties:

P1 A block B can have between 0 and N nodes (both inclusive). If two cutvertices are connected by a bridge, then the corresponding block contains no nodes. Block B3 in FIG. 9B illustrates this point. If the original graph has no cutvertices, then it is already biconnected and its block tree includes only one node that contains all N vertices.

P2 A block tree is a bipartite graph. The two classes of the bipartite graph are cutvertices and blocks. No two cutvertices can be adjacent in the block tree, neither can be two blocks.

P3 The block tree is a tree. Because the block tree is bipartite, it cannot have an odd-cycle. The presence of an even cycle would mean that two blocks are connected via two different cutvertices. In that case, one of the two cutvertices can be safely removed without disconnecting the graph. This presents a contradiction and, thus, a block tree is a tree.

P4 A block tree BT of a graph G can be computed in linear $(O(|V|+|E|))$ time. This can be achieved during a depth first traversal (DFT), which is a technique generally known to those skilled in the art, of graph G in the same pass.

While executing a DFT process on an undirected graph, an arbitrary node may be chosen as the root. The process may traverse fresh edges of the graph and mark the traversed nodes as "visited." The process may also place identifiers for these nodes onto a stack data structure. The process may continue until a node that is only connected to already visited nodes is reached. At this point, the process may backtrack up to a vertex that has edges connecting it to nodes that have not yet been visited. The node at this vertex will be a cutvertex of the graph. Once a cutvertex has been identified, the process may remove identifiers for the downstream nodes from the stack into a set that corresponds to a biconnected component (called a "block"). Because the above-described acts can be executed during DFT in the same pass, identification of cutvertices and blocks takes only linear time.

A salient property of a block is that it is a connected subgraph of graph G. Therefore, if all nodes in a block are moved together using the same movement vector, distances between all pairs of nodes in that block will remain the same and there will not be any change in the connectivity inside that block. On the other hand, if only one or more nodes in a block are moved, it may result in a change of connectivity within the block. In an implementation consistent with the principles of the invention, all nodes within a block are moved collectively.

Every node should have the same view of the network topology and, therefore, the same internal representation of the graph G. As a result, the DFT process results in the same block tree BT at all of the nodes. This can be achieved by a systematic insertion of nodes and edges ordered by node identifiers into graph G at every node.

Suppose a block $B_k$ (not shown) has edges with two cutvertices $c_u$ (not shown) and $c_v$ (not shown) in block tree BT. Let blocks $B_m$ (not shown) and $B_n$ (not shown) be two blocks connected to cutvertices $c_u$ and $c_v$, respectively. In order to minimize the $D_{total}$ metric, the blocks should move as little as possible. If block $B_k$ moves towards block $B_m$, cutvertex $c_u$ may cease to be a cutvertex but some other node in block $B_n$ may become one as the link between block $B_k$ and cutvertex $c_v$ may be broken. Therefore, no progress may be made towards reducing the number of cutvertices in G after this block movement. To prevent this from happening, only blocks in BT that have degree 1 may move.

In order to heuristically minimize the total distance moved, a block that has the maximum number of nodes may be selected as the root block of BT (act 840), and identify all other blocks with degree 1 as leaf blocks (i.e., those nodes in the block tree that have only one emanating edge) (act 850). In the example shown in FIGS. 9A and 9B, block B5 may be selected as the root block. Blocks B1, B2, and B4 may be identified as leaf blocks.

The leaf blocks, and, thus, the nodes within those blocks, may then move to make the network biconnected by systematically removing the cutvertices from BT (act 860). In the example of FIG. 9B, all nodes in block B4 may move towards block B5 since block B5 is the parent of block B4. Blocks B1 and B2, on the other hand, have an empty parent block B3. As a result, all nodes in these blocks may move towards the parent cutvertex of the parent block (i.e., cutvertex c2).

Every block may move in the direction towards the nearest node in the parent block, whenever applicable, by enough distance such that exactly one new edge appears between the current and the parent block. The appearance of this new edge may cause the cutvertex between the two blocks to vanish. Therefore, in one iteration of this processing, several cutvertices may be removed. The time complexity of finding the nearest node as a target edge partner may require $B^2$ comparisons if B is the average number of nodes in a block. Since $B=O(|V|)$ in the worst case scenario, the process of finding the nearest node has a worst case time complexity of $O(|V|^2)$.

For large networks, several iterations may be needed to remove layers of cutvertices before only one block remains. Also, after every iteration as the number of blocks increases, the blocks grow in size. Therefore, a small amount of movement by a large block may contribute a significant amount to $D_{total}$.

The above processing may be implemented by a MakeBiconnected process performed by movement controller 240 (FIG. 2). The MakeBiconnected process may be represented by:

```
Given: G
G_orig ← G;
BT ← Compute_Biconnected_Components(G);
while (Number_of_Nodes(BT) > 1) do
    MarkRootBlock(BT);
    MarkOtherBlocks(BT);
    Move_Leaf_Blocks(G, BT);
    BT ← nil;
    Recalculate_Edges(G);
    BT ← Compute_Biconnected Components(G);
end while
G is now biconnected;
D_total ← Calculate_Distance_Moved(G_orig, G);
```

The MarkRootBlock(BT) function selects a root block with a maximum number of nodes. The MarkOtherBlocks(BT) function marks leaf blocks and parents. The Move_Leaf_Blocks(G, BT) function may be represented by:

Given: G, BT
for all nodes blk∈BT do
    if (blk is a BLOCK node and a LEAF) then

```
par_cv ← BT.parent [blk];
par_blk ← BT.parent [par_cv];
if (Number_of_Nodes(BT[par_blk]) ≠ 0) then
    nearest ← Find_Nearest_Node(G, blk, par_blk);
    Translate_Block(BT, blk, nearest);
else
    pcv ← BT.parent [par_blk];
    Translate_Block(BT, blk, pcv);
end if
end if
end if
```

The variable $par_{cv}$ refers to a parent cutvertex and the variable $par_{blk}$ refers to a parent block. The function Find_Nearest_Node(G, blk, $par_{blk}$) identifies a node in $par_{blk}$ that is nearest from blk. The function Translate_Block(BT, blk, nearest) moves all nodes in blk towards the identified nearest node. The function Translate_Block(BT, blk, pcv) moves all nodes in blk toward the parent cutvertex of $par_{blk}$ (i.e., pcv).

In the worst case, there may be $O(|V|)$ iterations of the while loop of the MakeBiconnected process before achieving a biconnected configuration (e.g., in the case of a line graph). Because the number of iterations is bounded, however, convergence may be assured in almost all situations except for very special cases. One special case involves the situation where a block's movement causes an oscillation between two points. This special case is illustrated in FIG. 10. This special case can be solved by moving the block towards the nearest node that is a direct parent of the cutvertex. Although doing this repeatedly also guarantees convergence, this process may be used only when movement toward a nearest node in the parent block does not remove a cutvertex.

There can be two different schemes for moving the nodes: (1) nodes start moving as soon as a single iteration is over, or (2) no node actually starts moving until the final positions of the nodes have been determined (i.e., after convergence of the MakeBiconnected process). Because the convergence occurs rapidly even for large networks, the latter scheme may result in a much lower value of $D_{total}$ due to the vector addition of movement vectors for every node over all iterations of the function.

Figure 11B:
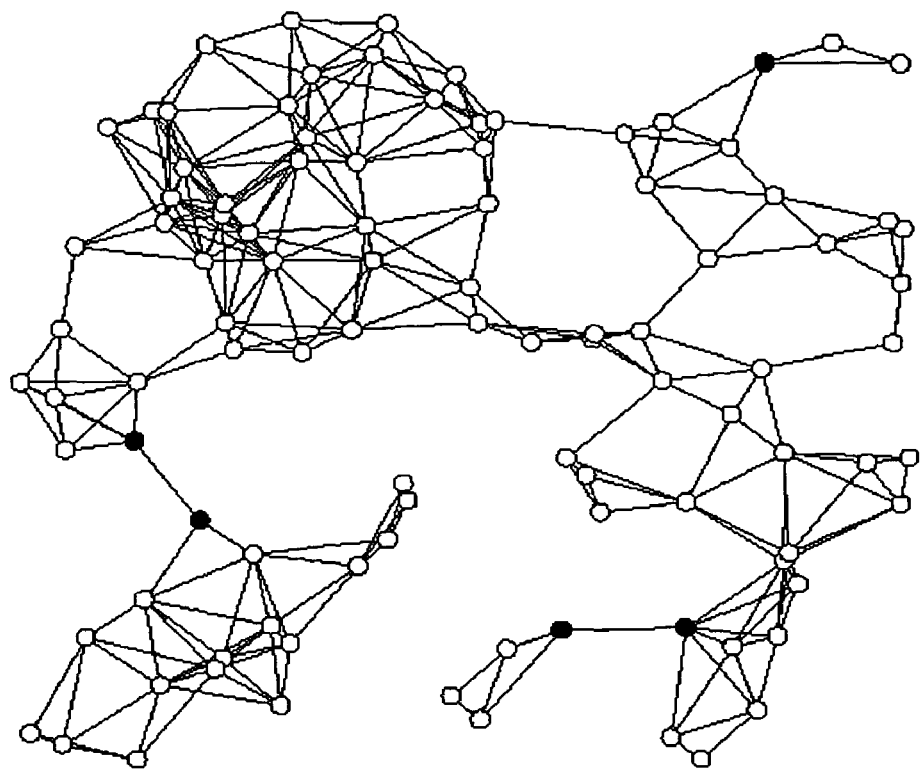
FIGS. 11A-11D illustrate an exemplary execution of a MakeBiconnected process on a randomly selected initial network topology.
Figure 11A:
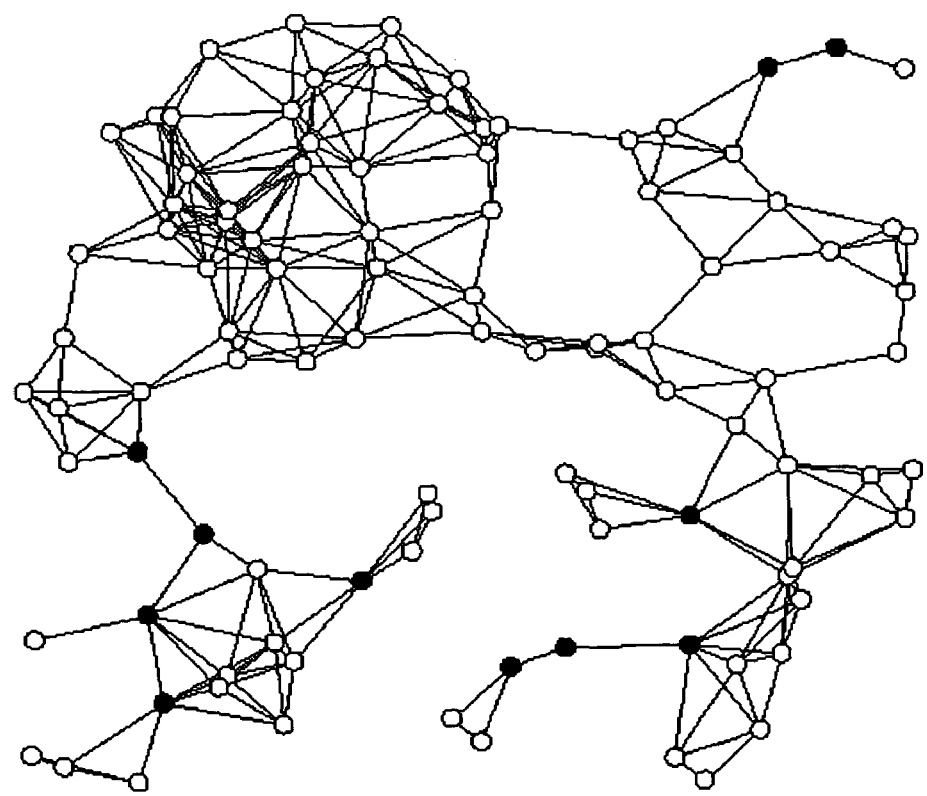
Figure 11D:
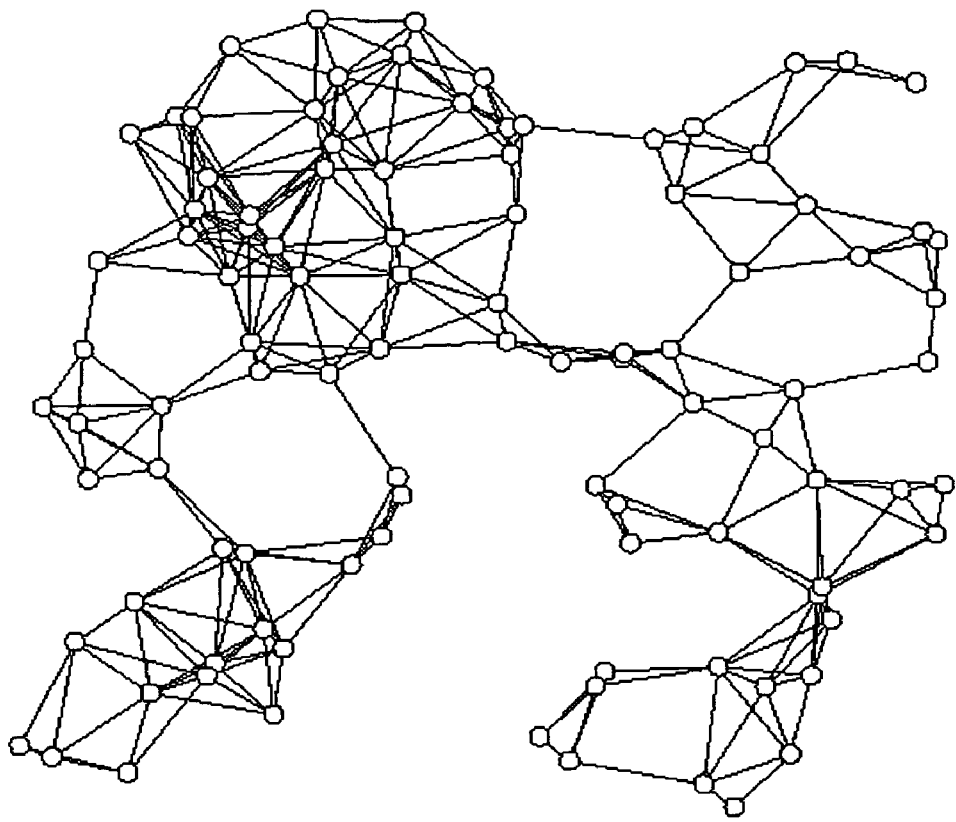
Figure 11C:
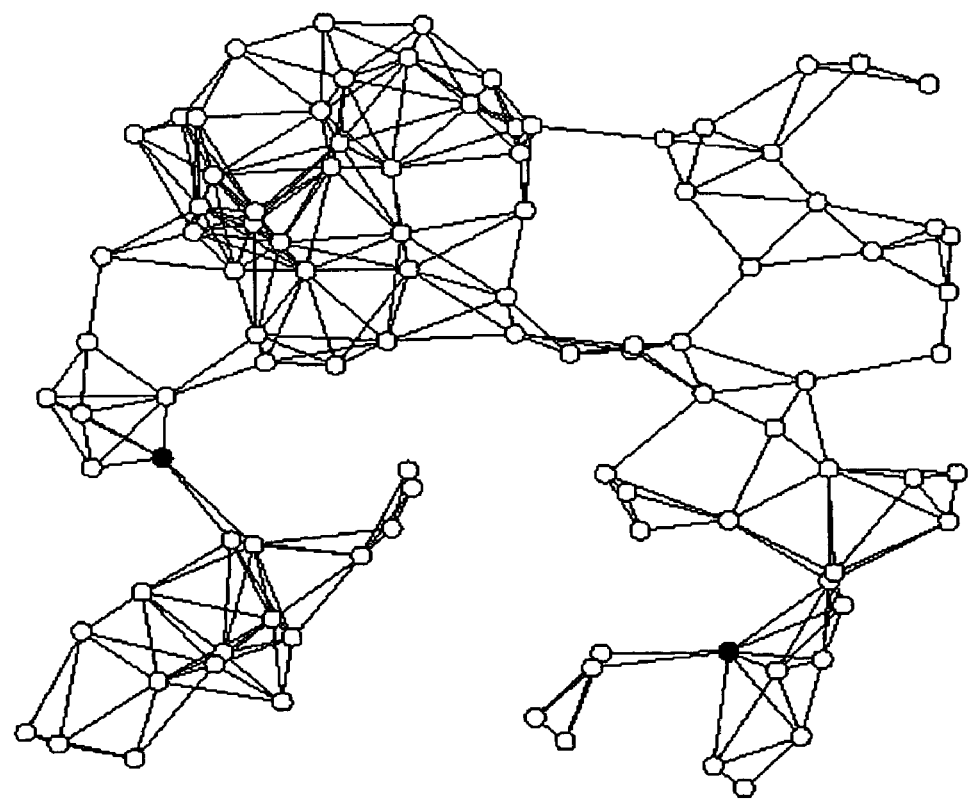

FIGS. 11A-11D illustrate an exemplary execution of the MakeBiconnected process on a randomly selected initial network topology. The dark points represent cutvertices in the network. FIG. 11A illustrates an initial configuration of the network. There are eleven cutvertices in the initial configuration. FIG. 11B illustrates the network after one iteration of the MakeBiconnected process. Six cutvertices have been removed, leaving five remaining cutvertices. FIG. 11C illustrates the network after a second iteration of the MakeBiconnected process. Now, only two cutvertices remain. FIG. 11D illustrates a final biconnected network configuration. As can be seen, the MakeBiconnected process systematically removes the cutvertices from the network to make the network biconnected after only two iterations.

While the above-described processing attempts to move leaf blocks only towards their parent blocks or cutvertices in order to remove cutvertices, it may be possible to move leaf blocks towards a non-parent block to remove several cutvertices in a single iteration. Therefore, a more intelligent block movement scheme can reduce $D_{total}$ as well as the number of iterations in suitable situations.

Exemplary Simulation Results

A simulation was performed on a network that included 200 collinear nodes with positions chosen randomly from [0, 100] ⊂ R. Each node was assumed to have a transmission range of 1:0. It was also assumed that all positions corresponding to the initial configuration are known initially. An LP was formulated, as described above, and then optimally solved using matlab.

Figure 12A:
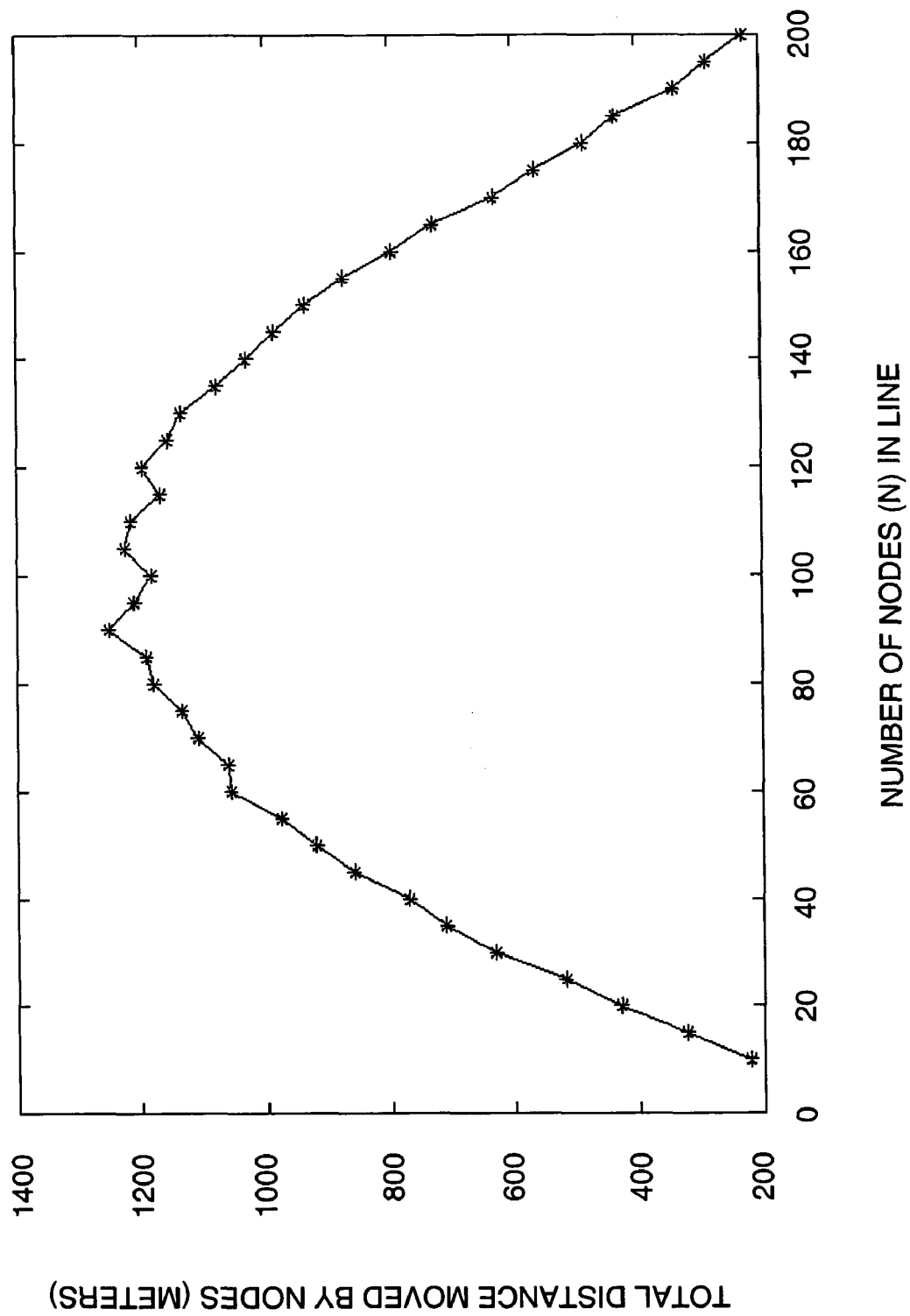
FIGS. 12A and 12B are exemplary graphs that illustrate performance of the one-dimensional technique.
Figure 12B:
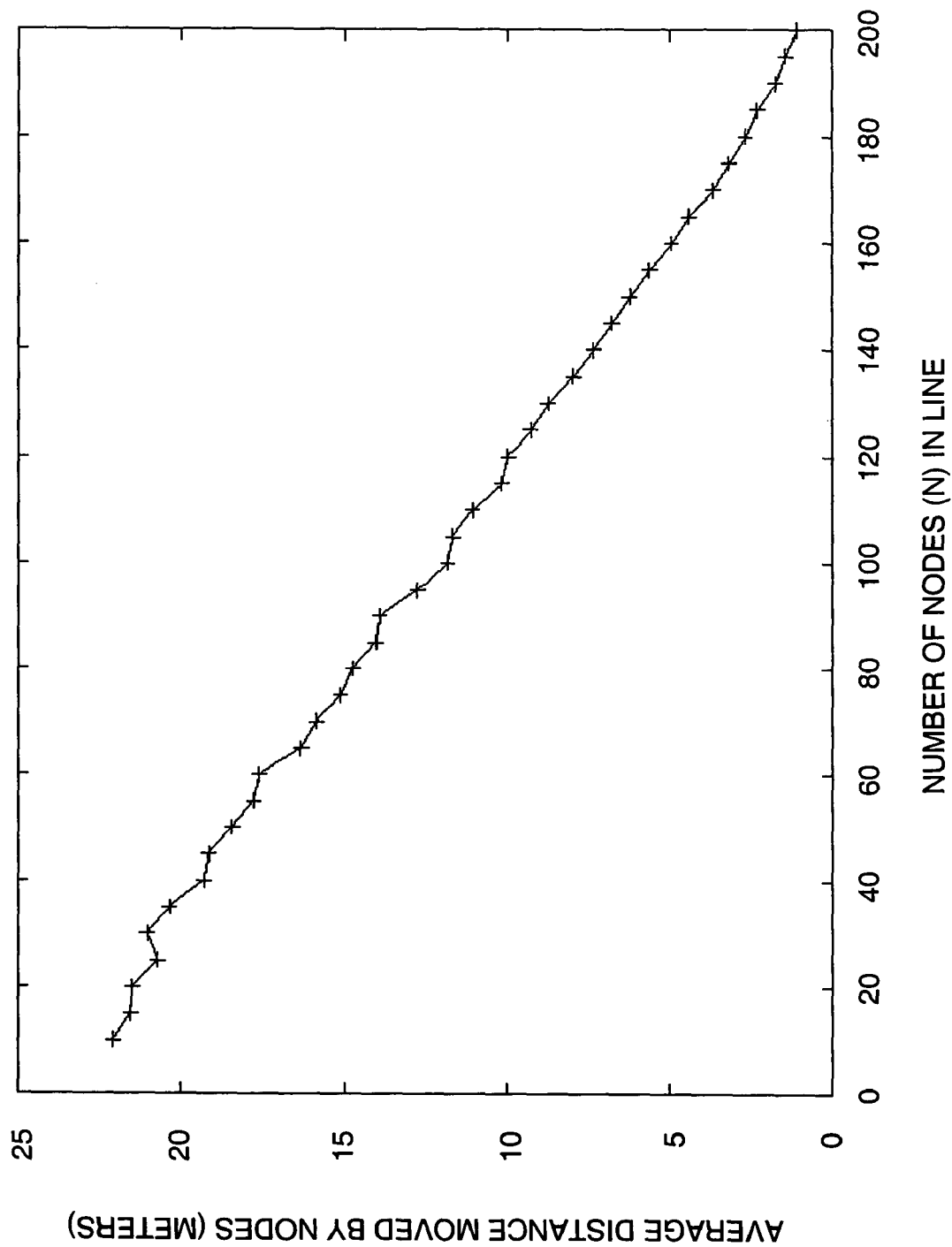

FIGS. 12A and 12B are graphs that illustrate the total distance moved "$D_{total}$" and the average distance moved "$D_{avg}$" by nodes (N) as N is varied. As illustrated in FIG. 12A, $D_{total}$ increases and then decreases in a parabolic fashion as N is increased. One reason for this is because for low values of N, although the initial distances between the nodes is large (owing to uniform random distribution on [0, 100]), there are only a small number of nodes that contribute to $D_{total}$.

For large N~200, the network is very dense and most of it is already biconnected. As a result, $D_{total}$ is low. The peaks are observed for values of N~100 because the network is large and fragmented and many nodes have to move significant distances to achieve biconnectivity.

As illustrated in FIG. 12B, $D_{avg}$ decreases linearly as N increases. Reasons for this are similar to those given above with regard to changes in $D_{total}$.

Another simulation was performed on a network that included a 1 km×1 km square area with up to 50 nodes randomly distributed therein. All of the nodes were assumed to have omni-directional antennas with transmission ranges of 250 meters each. The ground was assumed to be flat and devoid of obstacles and trenches, thus, allowing the nodes to move anywhere they want. The initial random configuration of nodes may obey a uniform probability distribution while keeping the network connected. One hundred runs for every data point were simulated with the same parameters.

Figure 13A:
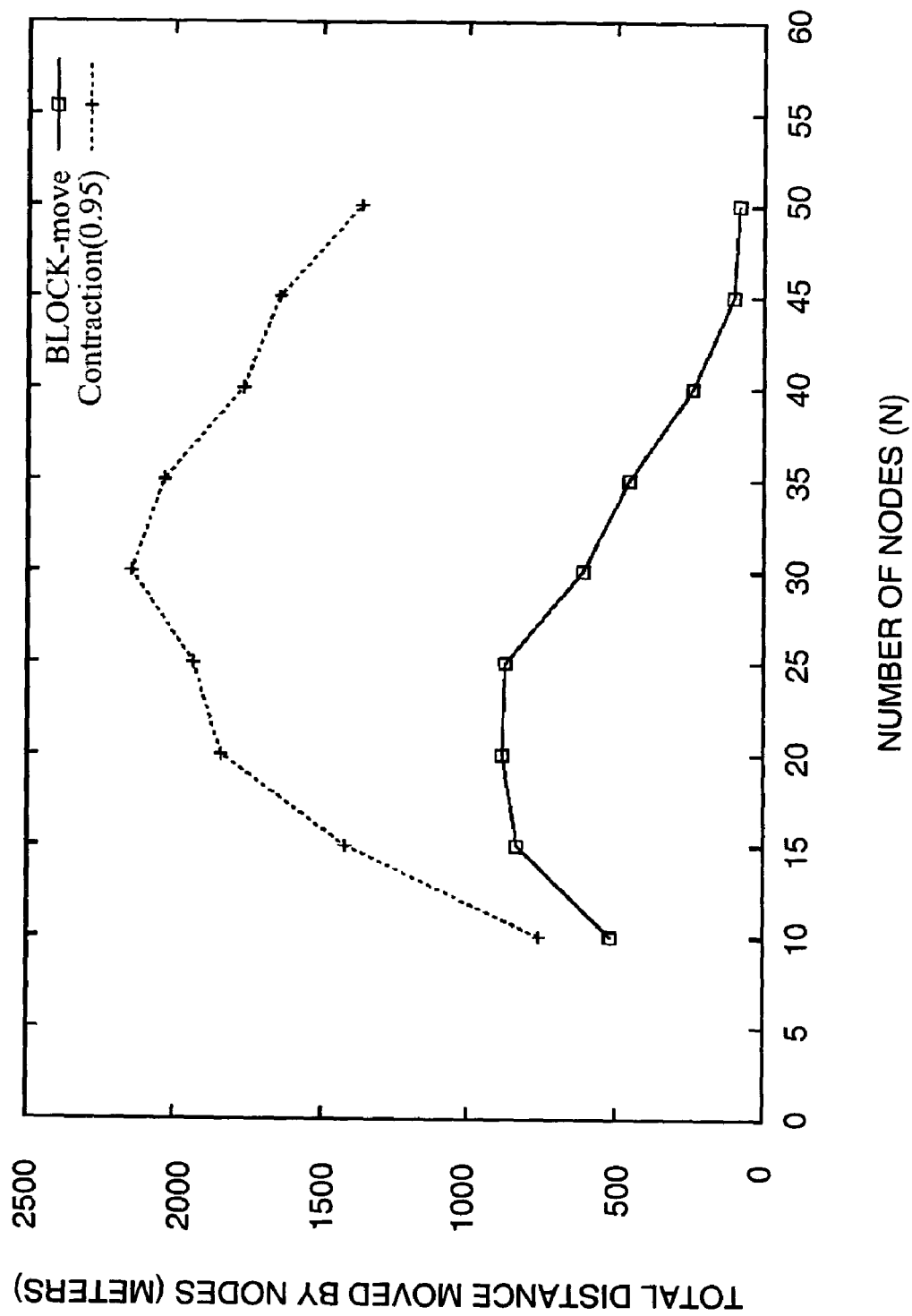
FIGS. 13A and 13B are exemplary graphs that compare the performance of the block movement technique against the contraction technique in a simulated network.
Figure 13B:
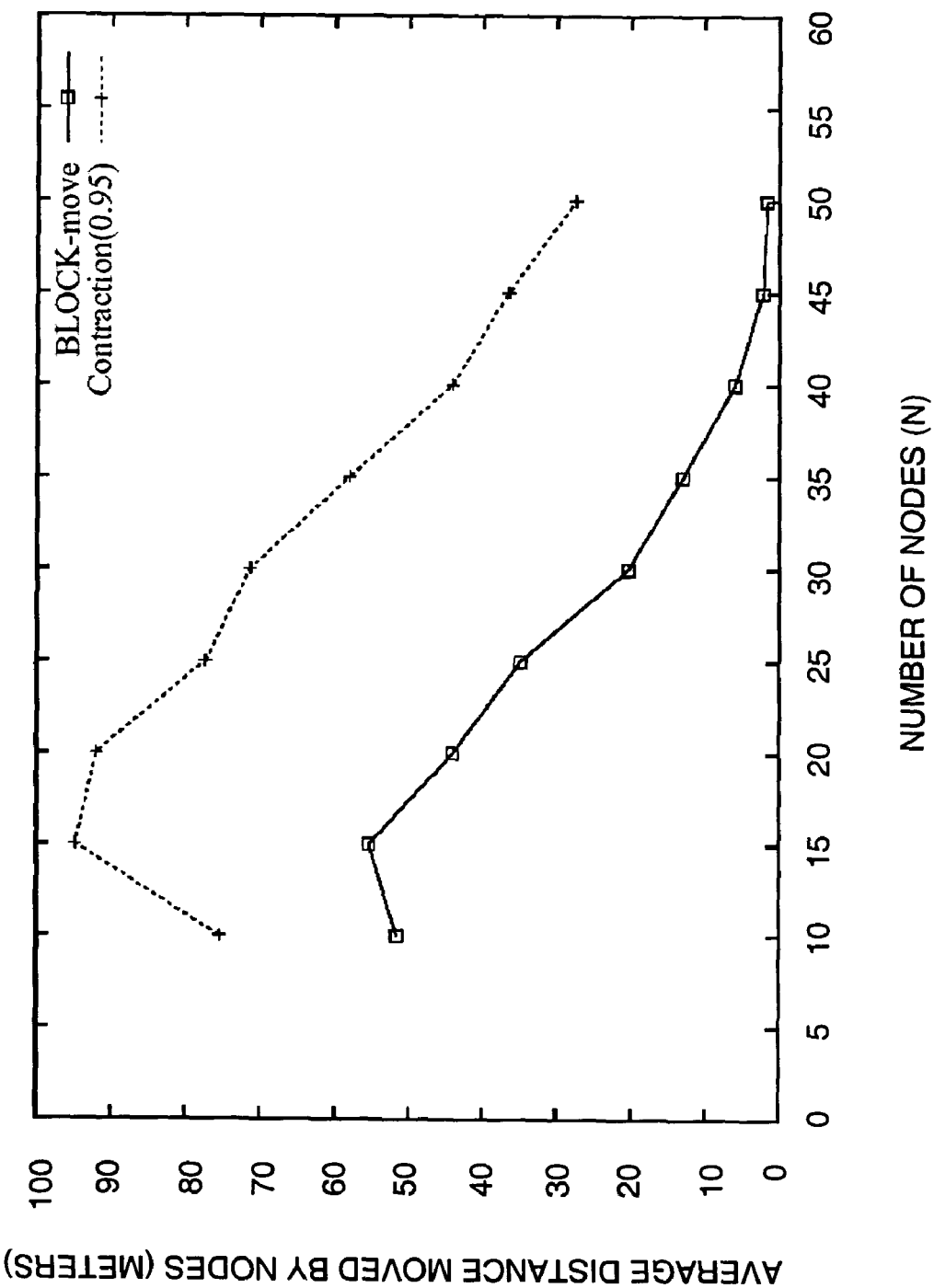

FIGS. 13A and 13B are graphs that compare the performance of the block movement technique against the contraction technique (both described above) with respect to the total distance moved metric "$D_{total}$" (FIG. 13A) and average distance moved metric "$D_{avg}$" (FIG. 13B) while varying the number of nodes (N), and hence the density, in the simulated network. The block movement technique appears to outperform the contraction technique for all values of N considered. One reason for this may be due to the fact that the contraction technique is an ad hoc approach that may unnecessarily move every node, thereby increasing the value of $D_{total}$.

As shown in FIG. 13A, the total distance moved increases and then decreases for both techniques, as N is increased from 10 to 50. The reason behind this is that for low values of N, there are only a few nodes that can move and also since the topology is connected, the nodes are not very far from each other. This results in a low value of $D_{total}$. As N increases, more nodes have to move to make the network biconnected, and this increases $D_{total}$. As N increases beyond a certain threshold, however, $D_{total}$ begins to drop significantly. This is because higher values of N result in richer, denser topologies that do not have a large number of non-biconnected components. In other words, a little movement causes the topology to become biconnected.

As shown in FIG. 13B, the curves for the $D_{avg}$ metric look similar to their counterparts for the $D_{total}$ metric apart from the fact that the peaks are shifted slightly to the left owing to division by N.

Figure 14:
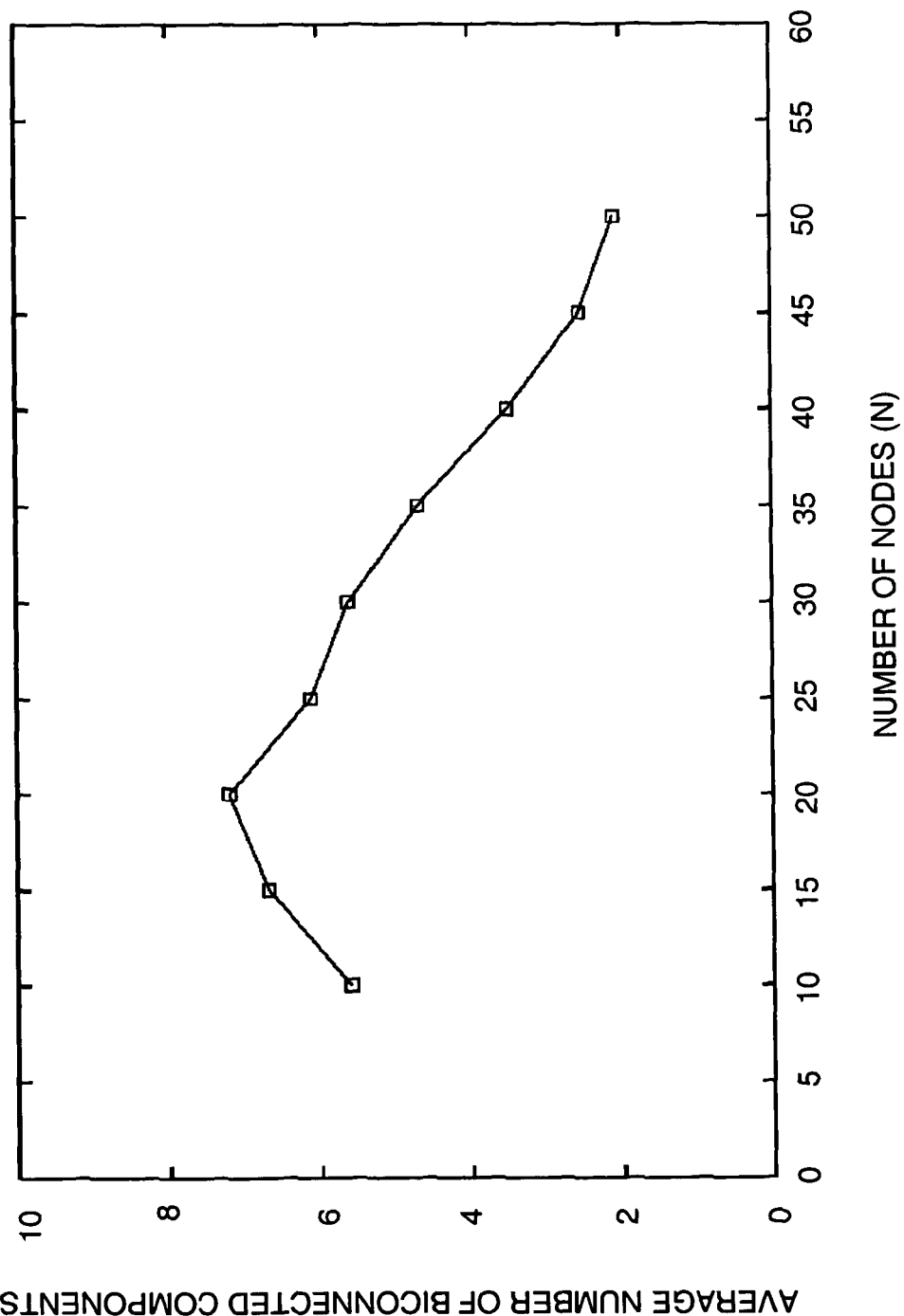
FIG. 14 is an exemplary graph of an average number of biconnected components versus the number of nodes in a simulated network.

FIG. 14 is a graph of an average number of biconnected components (or blocks) in the simulated network while varying the number of nodes (N), and hence the density, in the network. For low values of N, there are only a few blocks and the initial connectivity is sparse. Therefore, a large fraction of blocks have to move in order to make the network biconnected. This results in a high value of $D_{avg}$. For large values of N, however, the number of blocks reduces as the network is richly connected at many places, and only a small fraction of blocks needs to be moved to make the network biconnected. This results in low values of $D_{avg}$. In fact, for N=50, a node may have to move less than 5 meters on average while following the block movement technique, and about 30 meters on average while following the contraction technique.

Figure 15:
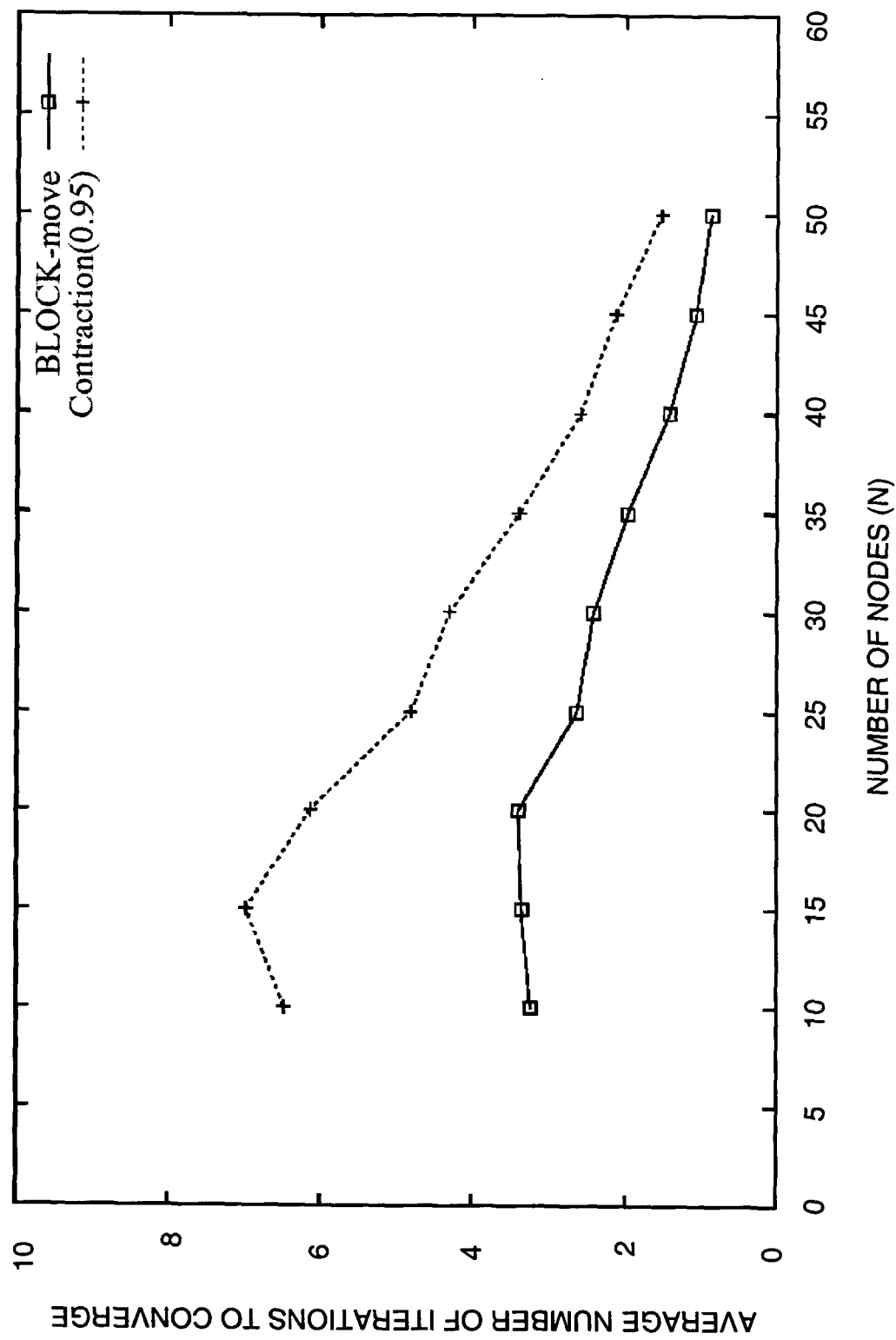
FIG. 15 is an exemplary graph of an average number of iterations needed to achieve biconnectivity in a simulated network.

FIG. 15 is a graph of the average number of iterations needed to achieve biconnectivity in the simulated network. As illustrated, the block movement technique requires a lesser number of iterations than the contraction technique. In the contraction technique, if the parameter α is decreased to approximately 0.7-0.8, then a lesser number of iterations would be required. In that case, however, there is a possibility of contracting the network more than necessary. As a result, a high value for α is typically chosen.

Figure 16:
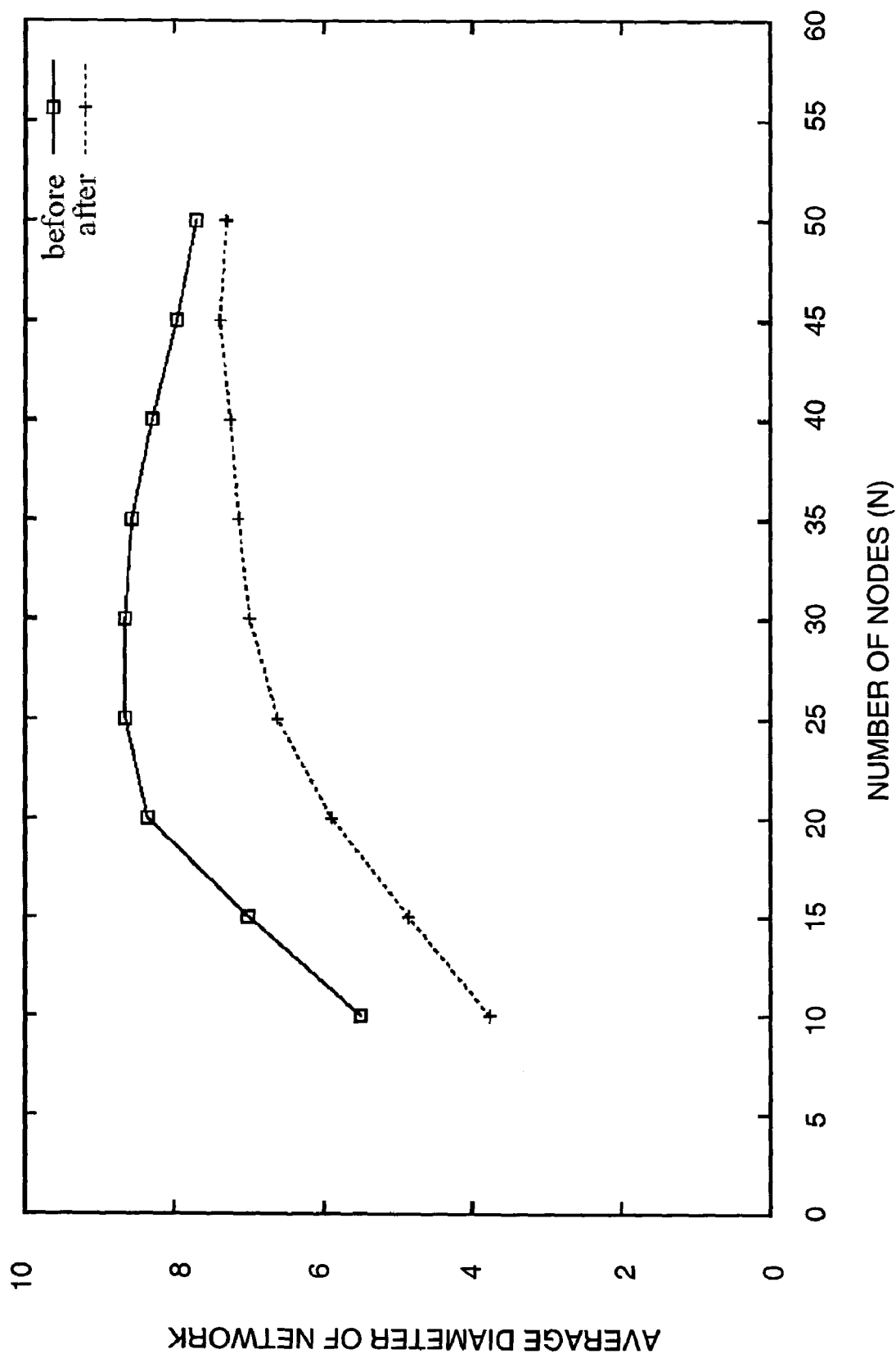
FIG. 16 is an exemplary graph of an average diameter of a simulated network while varying the number of nodes in the simulated network.

FIG. 16 is a graph of the average diameter of the simulated network while varying the number of nodes. The average diameter may be defined as the maximum length of a shortest path over all source-destination node pairs. The diameter shrinks for all values of N. The diameter is considered a monotonic property in the sense that it can only decrease when edges are added to the network.

CONCLUSION

Fault tolerance is an extremely desirable property in network design, and biconnectivity is a baseline feature in that domain. Because the position and movement of nodes in an ad hoc network of robotic nodes are controllable, greater fault tolerance can be achieved by moving nodes to locations that result in richer topologies. At the same time, nodes should move as little distance as possible to achieve the desired topological property. Systems and methods consistent with the principles of the invention provide techniques for moving nodes to new locations, such that the resulting network becomes biconnected.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the movement controller has been described as being implemented within each of the nodes of the network. In other implementations, the movement controller may be implemented in less than all of the nodes. For example, it may be conceivable that the movement controller in one node provides instructions to one or more other nodes on when and where to move.

Further, in implementations described thus far, systems and methods have been described for moving nodes within an existing network to achieve biconnectivity. In other implementations, similar systems and methods may be used to form a new network by placing nodes at appropriate locations to achieve biconnectivity. In yet other implementations, similar systems and methods may be used to place new nodes in an existing network to maintain the biconnectivity of the network.

While series of acts have been described with regard to FIGS. 4, 6, and 8, the order of the acts may differ in other implementations consistent with the principles of the invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for achieving biconnectivity in a network that includes a plurality of nodes, the method comprising:
    forming blocks from groups of one or more of the nodes in the network;
    selecting one of the blocks as a root block;
    identifying other ones of the blocks as leaf blocks; and
    collectively moving the nodes in one or more of the leaf blocks to make the network biconnected.

2. The method of claim 1, wherein the forming blocks includes:

generating a graph of a current view of a topology of the network, and generating a block tree based on the current view of the topology of the network, the block tree organizing the nodes into one or more blocks.

3. The method of claim 2, wherein the generating a graph includes:

determining locations of the nodes in the network, and determining the current view of the topology of the network based on the locations of the nodes in the network.

4. The method of claim 3, wherein the determining locations of the nodes includes:

periodically receiving updates from the nodes, each of the updates includes a location of a corresponding one of the nodes.

5. The method of claim 4, wherein the determining locations of the nodes further includes:

extracting neighbor information from the updates.

6. The method of claim 1, further comprising:

identifying cutvertices in the network.

7. The method of claim 6, wherein the collectively moving the nodes in one or more of the leaf blocks includes:

moving one or more of the leaf blocks to remove one or more of the cutvertices from The network.

8. The method of claim 1, wherein the selecting one of the blocks includes:

identifying one of the blocks that includes a maximum number of nodes as the root block.

9. The method of claim 1, wherein the moving one or more of the leaf blocks includes:

moving all of the nodes within one of the leaf blocks collectively when the leaf block is moved without changing connectivity within the leaf block.

10. The method of claim 1, wherein the one or more of the leaf blocks are moved while minimizing a total distance moved by all of the nodes in the network.

11. The method of claim 1, wherein the collectively moving the nodes in one or more of the leaf blocks includes:

moving one of the leaf blocks, as a particular leaf block, towards a nearest node in another one of the blocks.

12. The method of claim 11, wherein the particular leaf block is moved towards the nearest node until at least one new edge appears between the particular leaf block and the other one of the blocks.

13. The method of claim 1, wherein the collectively moving the nodes in of one or more of the leaf blocks is performed iteratively until the network is biconnected.

14. The method of claim 1, wherein the collectively moving the nodes in of one or more of the leaf blocks is performed after final positions for the one or more of the leaf blocks is determined.

15. The method of claim 1, wherein the method is performed by one or more of the nodes in the network.

16. The method of claim 1, wherein the method is performed by each of the nodes in the network.

17. The method of claim 1, wherein the nodes are capable of moving on their own.

18. The method of claim 1, wherein the nodes include robotic nodes.

19. A system for achieving biconnectivity in a network that includes a plurality of nodes, comprising at least one processor configured to:

group subsets of the nodes into blocks;

identify cutvertices in the network; and collectively move the subset of nodes in one or more of the blocks for a number of iterations to remove the cutvertices from the network.

20. The system of claim 19, where the means for processor is further configured to move the subset of nodes in one of the blocks toward one of the nodes in another one of the blocks.

21. In a network that includes a plurality of nodes, at least one of the nodes comprising:

a network device that is capable of moving within the network; and a movement controller configured to:

generate a current view of the network, form blocks from groups of one or more of the nodes in the network based on the current view of the network, and identify one or more of the blocks, as one or more identified blocks, to move to make the network biconnected.

22. The at least one node of claim 21, wherein the movement controller is further configured to instruct the network device to move to a particular location when the at least one node is one of the nodes in one of the one or more identified blocks.

23. The at least one node of claim 22, wherein all of the nodes within the one of the one or more identified blocks move collectively.

24. The at least one node of claim 21, wherein when generating a current view of the network, the movement controller is configured to:

determine locations of the nodes in the network, and determine a current topology of the network based on the locations of the nodes in the network.

25. The at least one node of claim 24, wherein when determining locations of the nodes, the movement controller is configured to periodically receive updates from the nodes, each of the updates including a location of the corresponding node.

26. The at least one node of claim 25, wherein when determining locations of the nodes, the movement controller is further configured to extract neighbor information from the updates.

27. The at least one node of claim 21, wherein the movement controller is further configured to identify cutvertices in the network.

28. The at least one node of claim 27, wherein when identifying one or more of the blocks to move, the movement controller is configured to identify a distance and direction to move the one or more identified blocks so as to remove one or more of the cutvertices from the network.

29. The at least one node of claim 21, wherein the movement controller is further configured to:

identify one of the blocks that includes a maximum number of nodes as a root block, and identify other ones of the blocks as leaf blocks, the one or more identified blocks being ones of the leaf blocks.

30. The at least one node of claim 21, wherein the movement controller is further configured to determine a distance and direction that the one or more identified blocks should move.

31. The at least one node of claim 30, wherein the one or more identified blocks are moved so as to minimize a total distance moved by all of the nodes in the network.

32. The at least one node of claim 30, wherein each of the one or more identified blocks, as a particular block, is to move towards a nearest node in a parent block.

33. The at least one node of claim 32, wherein the particular block is to move towards the nearest node until at least one new edge appears between the particular block and the parent block.

34. The at least one node of claim 21, wherein moving of the one or more identified blocks is performed iteratively until the network is biconnected.

35. The at least one node of claim 21, wherein moving of the one or more identified blocks is performed after final positions for the one or more identified blocks is determined.

36. The at least one node of claim 21, wherein the at least one node includes all of the nodes in the network.

37. The at least one node of claim 21, wherein the nodes include robotic nodes.

38. A method for achieving biconnectivity in a network that includes a plurality of nodes, the method comprising:
generating a graph of the network;
identifying cutvertices in the network; and
causing one or more of the nodes in the network to move to systematically remove the cutvertices from the network and form a biconnected network.

39. A method for achieving biconnectivity in a non-biconnected network that includes a plurality of nodes, the method comprising:
identifying one or more of the nodes to move;
determining direction and distance to move the one or more nodes; and
moving the one or more nodes in the determined direction and distance to transform the non-biconnected network to a biconnected network.

40. The method of claim 39, wherein the identifying one or more of the nodes to move includes:
forming blocks from groups of at least one of the nodes in the non-biconnected network,
selecting one of the blocks as a root block, and
identifying other ones of the blocks as leaf blocks.

41. The method of claim 40, wherein the one or more nodes are included in one or more of the leaf blocks.

42. The method of claim 41, wherein the moving the one or more nodes includes:
moving the one or more nodes collectively with other ones of the one or more nodes within a same one of the leaf blocks.

43. The method of claim 39, wherein the determining direction and distance to move includes:
determining a geographic center of the non-biconnected network, and
determining weighted distances for moving the one or more nodes toward the geographic center.

44. The method of claim 43, wherein the weighted distances are related to distances that the nodes are from the geographic center.

45. The method of claim 43, wherein the direction for a particular node of the one or more nodes includes a straight line joining a starting position of the particular node and the geographic center.

46. A method for achieving biconnectivity in a non-biconnected network that includes a plurality of nodes, the method comprising:
determining a geographic center of the non-biconnected network; and
moving each of one or more of the nodes a weighted distance towards the geographic center to transform the non-biconnected network to a biconnected network.

47. In a network that includes a plurality of nodes, at least one of the nodes comprising:
a network device that is capable of moving within the network; and
a movement controller configured to:
determine locations of the nodes,
identify a geographic center of the network based on the locations of the nodes, and
determine a weighted distance that each of the nodes should move toward the geographic center to achieve biconnectivity in the network.

48. A system for achieving biconnectivity in a non-biconnected network that includes a plurality of nodes, the system comprising at least one processor configured to:
identify a geographic center of the non-biconnected network based on current locations of the nodes; and
cause each of one or more of the nodes to move towards the geographic center to transform the non-biconnected network to a biconnected network.

49. A non-transitory computer-readable medium that includes instructions that when executed by at least one processor causes the processor to perform a method for achieving biconnectivity in a network that includes a plurality of nodes, the computer-readable medium comprising:
instructions for determining a current topology of the network;
instructions for identifying cutvertices in the network based on the current topology of the network;
instructions for identifying one or more of the nodes in the network to move, and
instructions for causing each of the indentified one or more nodes to move in a particular direction to systematically remove the cutvertices from the network and form a biconnected network.

50. A method for achieving biconnectivity in a one-dimensional non-biconnected network that includes a plurality of nodes, comprising:
determining initial positions of the nodes in the one-dimensional non-biconnected network;
determining a movement schedule for the nodes using one or more linear programming techniques; and
causing one or more of the nodes to move based on the determined movement schedule to form a biconnected network from the one-dimensional non-biconnected network.

51. The method of claim 50, wherein the determining a movement schedule includes:
determining the movement schedule as an objective function,
converting the objective function into a linear programming representation, and
solving the linear programming representation optimally in polynomial time.

52. The method of claim 51, wherein the linear programming representation is solved as a function of a number of nodes in the one-dimensional non-biconnected network.

53. The method of claim 50, wherein each of the nodes in the biconnected network is capable of communicating with other ones of the nodes in the biconnected network one and two hops away.

54. A system for achieving biconnectivity in a one-dimensional non-biconnected network that includes a plurality of nodes, comprising at least one processor configured to:
determine initial positions of the nodes in the one-dimensional non-biconnected network;
determine a movement schedule optimally in polynomial time based at least in part on the initial positions of the nodes and a number of the nodes in the one-dimensional non-biconnected network; and
cause one or more of the nodes to move based on the determined movement schedule to achieve biconnectivity in the one-dimensional non-biconnected network.

55. The system of claim 54, wherein each of the nodes is capable of communicating with other ones of the nodes one and two hops away after biconnectivity is achieved in the one-dimensional non-biconnected network.

* * * * *